United States Patent
Allen et al.

(10) Patent No.: US 7,188,273 B2
(45) Date of Patent: Mar. 6, 2007

(54) SYSTEM AND METHOD FOR FAILOVER

(75) Inventors: Gregory Arthur Allen, Oakville (CA); Tudor Morosan, Toronto (CA)

(73) Assignee: TSX Inc., Toronto (CA)

( * ) Notice: Subject to any disclaimer, the term of this patent is extended or adjusted under 35 U.S.C. 154(b) by 605 days.

(21) Appl. No.: 10/718,616

(22) Filed: Nov. 24, 2003

(65) Prior Publication Data

US 2005/0138461 A1 Jun. 23, 2005

(51) Int. Cl.
*G06F 11/00* (2006.01)
(52) U.S. Cl. .......................................... 714/6
(58) Field of Classification Search ............ 714/6
See application file for complete search history.

(56) References Cited

U.S. PATENT DOCUMENTS

| | | | |
|---|---|---|---|
| 5,305,200 | A | 4/1994 | Hartheimer et al. |
| 5,381,545 | A | 1/1995 | Baker et al. |
| 5,596,706 | A | 1/1997 | Shimazaki et al. |
| 5,742,792 | A * | 4/1998 | Yanai et al. ............ 711/162 |
| 5,987,432 | A | 11/1999 | Zusman et al. |
| 6,154,847 | A | 11/2000 | Schofield et al. |
| 6,199,055 | B1 | 3/2001 | Kara et al. |
| 6,202,149 | B1 | 3/2001 | Hedegard |
| 6,308,287 | B1 | 10/2001 | Mitchell et al. |
| 6,493,826 | B1 | 12/2002 | Schofield et al. |
| 6,574,750 | B1 | 6/2003 | Felber et al. |

FOREIGN PATENT DOCUMENTS

WO    WO 03/009139 A    1/2003

OTHER PUBLICATIONS

Polyzois, C.A. et al. Association for Computing Machinery: "Evaluation of Remote Backup Algorithms for Transaction Processing Systems", proceedings of the ACM Sigmod International Conference on Management of Data. San Diego, Jun. 2-5, 1992, N.Y., ACM, US. Jun. 2, 1992.

Ioannidis, S. et al.: "On using Network Memory to Improve the Performance of Transaction-Based Systems" Technical Report, 'Online! No. 190, Apr. 14, 1997.

* cited by examiner

*Primary Examiner*—Bryce P. Bonzo
(74) *Attorney, Agent, or Firm*—T. Andrew Currier; Perry + Partners

(57) ABSTRACT

The present invention provides a novel system and method for failover. In an embodiment, a primary server and a backup server are available to a plurality of clients. Messages containing requests are processed by the primary server, while a mirror image of transaction records generated by the processing of those requests is maintained in volatile memory of both the primary server and the backup server. In this mode of operation, the volatile memory is periodically flushed to non-volatile memory.

22 Claims, 16 Drawing Sheets

SYSTEM AND METHOD FOR FAILOVER

FIELD OF THE INVENTION

The present invention relates to computer and network architecture and more particularly relates to a method and system for failover.

BACKGROUND OF THE INVENTION

Society is increasingly relying on computers and networks to interact and conduct business. To achieve a high level of availability demanded in critical systems, unplanned downtime caused by software and hardware defects should be minimized.

The financial services industry is but one example of an industry that demands highly available systems. Indeed, a large number of data processing activities in today's financial industry are supported by computer systems. Particularly interesting are the so-called "real-time" and "near real-time" On-Line Transaction Processing (OLTP) applications, which typically process large numbers of business transactions over a prolonged period, with high speed and low latency. Besides their high speed of execution, these applications generally exhibit the following characteristics: (1) complex data processing, (2) reliable non-volatile data storage, and (3) high level of availability, i.e. the ability to support the services on a substantially uninterrupted basis. When implemented, however, existing applications tend to tradeoff between these performance requirements, since, due to their contradictory effects on the system behavior, no design can completely satisfy all of three characteristics simultaneously, as outlined in greater detail below.

First, complex data processing refers to the ability to perform, in a timely fashion, a large number of computations, database retrievals/updates, etc. This can be implemented through parallel processing, where multiple units of work are executed simultaneously on the same physical machine or on a distributed network. In some systems, the outcome of each transaction depends on the outcomes of previously completed transactions. The parallel aspects of such systems are, inherently, non-deterministic: due to race conditions, operating system scheduling tasks, or variable network delays, the sequence of thread execution can not be predicted. Non-deterministic systems have non-identical output, so they are not run in parallel on two different computing machines, with the intention of having one substitute for the other in case of failure.

Second, reliable non-volatile data storage refers to the ability to persistently store the processed data, even if a number of the system's software or hardware components experience unexpected failure. This can usually be implemented by using Atomic, Consistent, Isolated, and Durable ("ACID") transactions when accessing or modifying the shared data. ACID transactions can ensure the data integrity and persistence as soon as a unit of work is completed. Every committed ACID transaction is written into the non-volatile computer memory (hard-disk), which helps ensure the data durability, but it is very costly in terms of performance and typically slows down the whole system.

Third, highly available systems attempt to ensure that percentage of availability of a given computer system is as close as possible to 100% of the time. Such availability can be implemented through redundant software and/or hardware, which takes over the functionality in case a component failure is detected. In order to succeed, the failover replicates not only the data, but also the process state. As will be appreciated by those of skill in the art, state replication can be particularly challenging in non-deterministic systems (i.e. systems where computational processing of the same set of events can have more than one result depending on the order in which those events are processed).

Highly available software applications are usually deployed on redundant environments, to reduce and/or eliminate the single point of failure that is commonly associated with the underlying hardware. Two common approaches are known as hot failover and warm failover. Hot failover refers to simultaneously processing the same input in multiple systems, essentially providing complete redundancy in the event of a failure in one of those systems. Warm failover refers to replicating the state of the application (i.e. the data) in backup systems, without processing that data in the backup systems, but having applications capable of processing that data loaded and standing by in the event of failure of a primary system. Cold failover, which is not considered by many to be a form of high availability, refers to simply powering-up a backup system and preparing that backup system to assume processing responsibilities from the primary system.

In hot failover configurations, two instances of the application are simultaneously running on two different hardware facilities, processing copies of the same input. If one of them experiences a critical failure, a supplemental synchronization system can ensure that the other one will continue to support the workload. In the warm failover configurations, one of the systems, designated primary, is running the application; in case of failure, the second system, designated backup, which is waiting in a standby state, will "wake up", take over, and resume the functionality.

The hot failover approach has two disadvantages. First, since the two systems are identical, a software defect will cause both of them to fail simultaneously, and second supplemental software has to run in order to keep the two systems in synchronism. In the case of non-deterministic systems, this synchronization effort can lead to an unacceptable (or otherwise undesirable) decrease in performance and complexity where the order of arrival of events must be guaranteed to be identical.

Also, concurrent systems used in such applications typically allow multiple threads to execute simultaneously, so they are inherently non-deterministic. Also non-deterministic are the systems with servers and geographically distributed clients, where the variable network delay delivers the messages to the server in an unpredictable sequence.

Warm failover can be used to overcome certain problems with hot failover. Warm failover can be another way to implement failover of non-deterministic systems, by replicating the system data to a redundant, backup system, and then restoring the application functionality to the secondary system. This approach has its drawbacks in the time required to recover the data to a consistent state, then to bring the application to a functional state, and lastly, to return the application to the point in processing where it left off. This process normally takes hours, requires manual intervention, and cannot generally recover the in-flight transactions.

A number of patents attempt to address at least some of the foregoing problems. U.S. Pat. No. 5,305,200 proposes what is essentially a non-repudiation mechanism for communications in a negotiated trading scenario between a buyer/seller and a dealer (market maker). Redundancy is provided to ensure the non-repudiation mechanism works in the event of a failure. It does not address the fail-over of an on-line transactional application in a non-deterministic environment. In simple terms, U.S. Pat. No. 5,305,200 is directed to providing an unequivocal answer to the question: "Was the order sent, or not?" after experiencing a network failure.

U.S. Pat. No. 5,381,545 proposes a technique for backing up stored data (in a database) while updates are still being made to the data. U.S. Pat. No. 5,987,432 addresses a fault-tolerant market data ticker plant system for assembling world-wide financial market data for regional distribution. This is a deterministic environment, and the solution focuses on providing an uninterrupted one-way flow of data to the consumers. U.S. Pat. No. 6,154,847 provides an improved method of rolling back transactions by combining a transaction log on traditional non-volatile storage with a transaction list in volatile storage. U.S. Pat. No. 6,199,055 proposes a method of conducting distributed transactions between a system and a portable processor across an unsecured communications link. U.S. Pat. No. 6,199,055 deals with authentication, ensuring complete transactions with remote devices, and with resetting the remote devices in the event of a failure. In general, the foregoing do not address the fail-over of an on-line transactional application in a non-deterministic environment.

U.S. Pat. No. 6,202,149 proposes a method and apparatus for automatically redistributing tasks to reduce the effect of a computer outage. The apparatus includes at least one redundancy group comprised of one or more computing systems, which in turn are themselves comprised of one or more computing partitions. The partition includes copies of a database schema that are replicated at each computing system partition. The redundancy group monitors the status of the computing systems and the computing system partitions, and assigns a task to the computing systems based on the monitored status of the computing systems. One problem with U.S. Pat. No. 6,202,149 is that it does not teach how to recover workflow when a backup system assumes responsibility for processing transactions, but instead directs itself to the replication of an entire database which can be inefficient and/or slow. Further, such replication can cause important transactional information to be lost in flight, particularly during a failure of the primary system or the network interconnecting the primary and backup system, thereby leading to an inconsistent state between the primary and backup. In general, U.S. Pat. No. 6,202,149 lacks certain features that are desired in the processing of on-line transactions and the like, and in particular lacks features needed to failover non-deterministic systems.

U.S. Pat. No. 6,308,287 proposes a method of detecting a failure of a component transaction, backing it out, storing a failure indicator reliably so that it is recoverable after a system failure, and then making this failure indicator available to a further transaction. It does not address the fail-over of a transactional application in a non-deterministic environment. U.S. Pat. No. 6,574,750 proposes a system of distributed, replicated objects, where the objects are non-deterministic. It proposes a method of guaranteeing consistency and limiting roll-back in the event of the failure of a replicated object. A method is described where an object receives an incoming client request and compares the request ID to a log of all requests previously processed by replicas of the object. If a match is found, then the associated response is returned to the client. However, this method in isolation is not sufficient to solve the various problems in the prior art.

Another problem is that the method of U.S. Pat. No. 6,574,750 assumes a synchronous invocation chain, which is inappropriate for high-performance On-Line Transaction Processing ("OLTP") applications. With a synchronous invocation the client waits for either a reply or a time-out before continuing. The invoked object in turn may become a client of another object, propagating the synchronous call chain. The result can be an extensive synchronous operation, blocking the client processing and requiring long time-outs to be configured in the originating client.

While the foregoing patents feature some aspect of fault-tolerance and recoverability, they do not address the notion of failing-over an application to a separate system for non-deterministic systems used for on-line transaction processing.

SUMMARY OF THE INVENTION

It is an object of the present invention to provide a novel system and method for failover that obviates or mitigates at least one of the above-identified disadvantages of the prior art. According to an aspect of the invention, there is provided a system for failover comprising at least one client that is selectively connectable to at least one of a primary server and at least one backup server via a network connection. The primary server and the backup server can be connected to each other in a normal state during which the primary server processes messages from the client and maintains a transaction log respective to each of the messages in random access memory, and during which the backup server is operable to maintain a mirror image of the transaction log. The transaction log is periodically flushed to a non-volatile storage device respective to each server. When the backup server is unavailable, the client is only connected to the primary server in a primary-only state. Meanwhile, the primary server processes messages from the client and maintains a transaction log respective to each of the messages in random access memory. After each message is processed, the primary server transaction log is flushed to the primary server non-volatile storage device.

When the primary server is unavailable, the client is only connected to the backup server in a backup-only state. Meanwhile, the backup server initially recovers a last-known state of the primary server, processes messages from the client and maintains the backup server transaction log respective to each message in random access memory. After each message is processed, the transaction log is flushed to the backup server non-volatile storage device immediately after each said message is processed.

In another aspect of the invention, a system for failover comprises at least one client, a primary server and at least one backup server interconnected via at least one network connection. The primary server(s) and the backup server(s) each execute an application for processing messages received from the clients, maintain a transaction log in random access memory, execute a replication agent and execute a checkpoint agent for flushing the transaction log to a non-volatile storage device respective to each said server. In this aspect of the invention, the system has three different states: a normal states, a primary-only state and a backup-only state. During the normal state only the primary server application processes messages and writes results thereof to the primary server transaction log and the replication agents are operable to mirror the primary server transaction log in the backup server transaction log and each transaction log is flushed according to a predefined criteria. During the primary-only state, the primary server application processes messages and writes the results to the primary server transaction log and the transaction log is simultaneously flushed to the primary server non-volatile storage device. During the backup-only state, only the backup server application processes the messages and writes the results thereof to the backup server transaction log and the backup server transaction log is simultaneously flushed to the backup server non-volatile storage device.

In another aspect of the invention, the client is connected to a primary server coupled to a backup server in a normal state, during which the primary server processes messages from the client and maintains a transaction log respective to each message in random access memory. Meanwhile, the backup server is operable to maintain a mirror image of the transaction log and the transaction logs are periodically flushed to a non-volatile storage device respective to each and server. When the backup server is unavailable, however, the client is only connectable to the primary server. At this time, the primary server processes messages from the client and maintains a transaction log respective to each message in random access memory. Meanwhile, the primary server transaction log is flushed to the primary server non-volatile storage device after each message is processed. When the primary server is unavailable, on the other hand, the client is only connected to the backup server, during which said backup server initially recovers a last-known state of said primary server and then processes messages from said client and maintains said backup server transaction log respective to each said message in random access memory. Meanwhile, the transaction log is flushed to the backup server non-volatile storage device immediately after each message is processed.

In yet another aspect of the present invention, the client is connected to a primary server coupled to a backup server when both servers are available. During this time, the primary server processes messages from the client and maintains a transaction log respective to each message in random access memory. Meanwhile, the backup server is operable to maintain a mirror image of the transaction log and the transaction logs are periodically flushed to a non-volatile storage device respective to each server. When one of the servers (i.e. either the primary or the backup server) is unavailable, the client is connectable to the server that is available, during which time the available server processes messages from the client and maintains a transaction log respective to each message in random access memory. Meanwhile, the available server transaction log is flushed to the non-volatile storage device respective thereto after each said message is processed.

In yet another aspect of the invention, at least one client is connectable to a plurality of interconnectable servers. Each server is operable to process messages from the client and maintains transaction records in respect to the messages in a transaction log stored in volatile storage. Each server is also operable to flush the transaction log to a non-volatile storage device respective to the server after each message is processed, wherein when more than one server is available then only one of the servers processes the messages and the remainder of the servers maintain a mirror image of the transaction log. The transaction logs are flushed on a periodic basis, and wherein when only one of the servers is available then the transaction log is flushed more frequently than said periodic basis.

In another aspect of the invention there is provided, a method for operating a system for failover comprising the steps of:

receiving, at a primary server, a request from a client;

processing, at said primary server, said request as at least one transaction;

saving, in volatile memory of said primary server, a transaction record respective to said at least one transaction;

generating, at said primary server, a request to commit said transaction;

mirroring said transaction record in volatile memory of said backup server; and, acknowledging, in said primary server, said commit request if said mirroring is successfully confirmed.

BRIEF DESCRIPTION OF THE DRAWINGS

The invention will now be described by way of example only, and with reference to the accompanying drawings, in which.

DETAILED DESCRIPTION OF THE INVENTION

Figure 1:
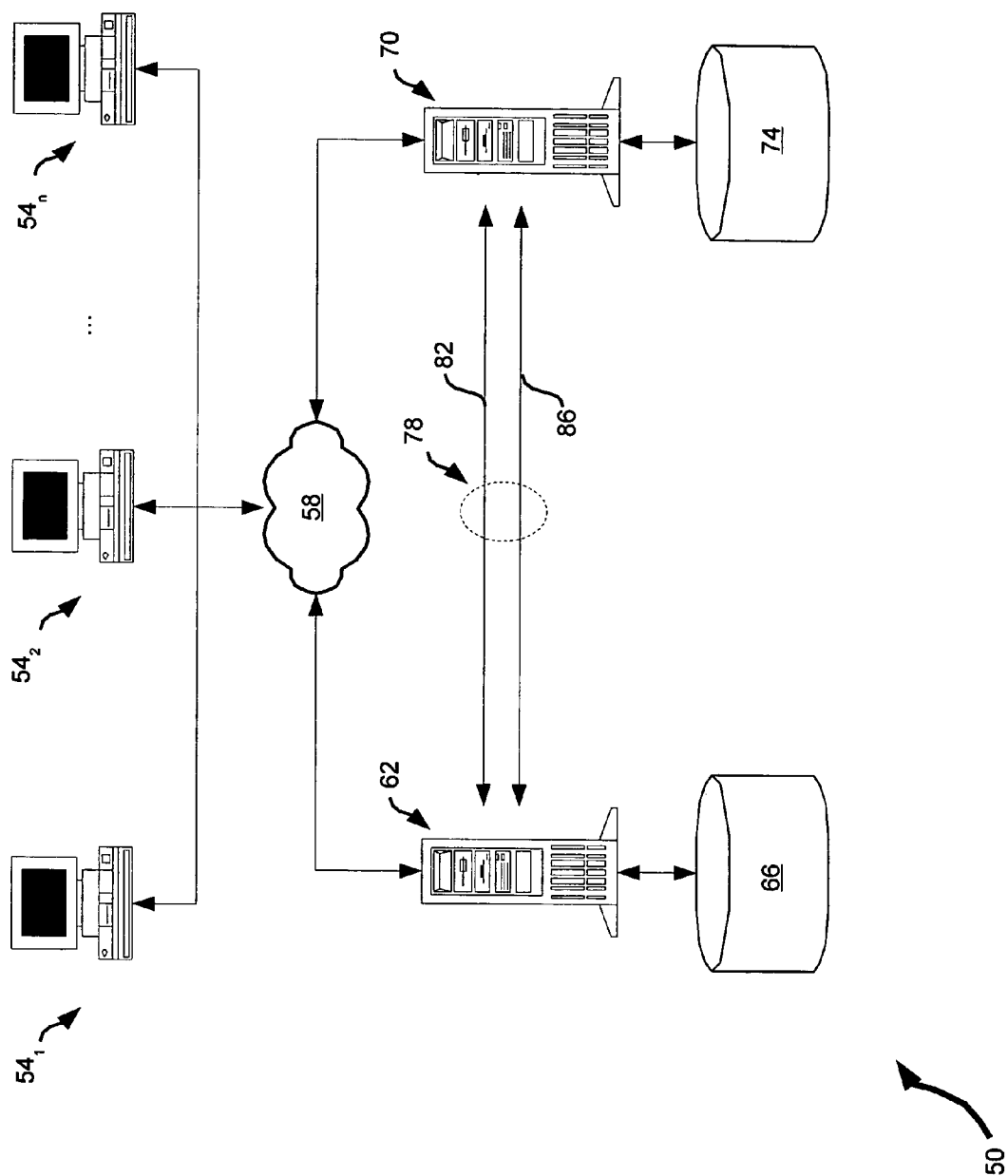
FIG. 1 is a schematic representation of a system for failover in accordance with an embodiment of the invention.

Referring now to FIG. 1, a system for failover is indicated generally at 50. System 50 comprises a plurality of remote clients $54_1$, $54_2$ . . . $54_n$ (generically referred to herein as "client 54" and collectively as "clients 54") all of which are connected to a network 58. Network 58 can be any type of computing network, such as the Internet, a local area network, a wide area network or combinations thereof. In turn, network 58 is connected to a primary server 62 and at least one backup server 70. Accordingly, clients 54 can each communicate with server 62 and server 70 via network 58, as will be discussed in greater detail below.

Clients 54 each belong to individuals or entities that will use their respective client 54 to submit requests to primary server 62. Each client 54 is typically a computing device such as a personal computer having a keyboard and mouse (or other input devices), a monitor (or other output device) and a desktop-module connecting the keyboard, mouse and monitor and housing one or more central processing units, volatile memory (i.e. random access memory), non-volatile memory (i.e. hard disk devices) and network interfaces to allow the client 54 to communicate over network 58. However, it is to be understood that client 54 can be any type of computing device, such as a personal digital assistant, cell phone, laptop computer, email paging device etc.

Primary server 62 can be any type of computing device operable to receive and process messages from clients 54, such as Sun Fire V480 running a UNIX operating system, from Sun Microsystems, Inc. of Palo Alto Calif., and having four central processing units each operating at about 900 megahertz and having about four gigabytes of random access memory. However, it is to be emphasized that this particular server is merely exemplary, a vast array of other types of computing environments for primary server 62 are within the scope of the invention. The type of message being received and processed by primary server 62 is not particularly limited, but in a present embodiment, server 62 operates an on-line trading system, and is thus able to process messages that include requests to purchase, sell, cancel etc. securities that can be traded on-line. More particularly, server 62 is operable to maintain a central matchine engine, where requests are executed against each other, and against a central repository of orders to thereby process the trading of securities. Primary server 62 is also connected to a primary non-volatile storage 66 that maintains all non-volatile data associated with the requests and processing thereof for primary server 62.

Backup server 70 typically has the identical (or substantially identical) computing environment as primary server 62. More particularly, the computing environment of backup server 70, including its hardware, operating system, applications, etc. will render backup server 70 operable to completely substitute the functionality of primary server 62 in the event of a failure of primary server 62. Accordingly, backup server 70 is also connected to a backup non-volatile storage 74 that maintains all non-volatile data associated with the requests and processing thereof for backup server 70.

System 50 also includes a replication link 78 that interconnects primary server 62 and backup server 70. In a present embodiment, replication link 78 itself includes a main link 82 and a failsafe link 86 to provide greater robustness in communications between primary server 62 and backup server 70.

Further details about the functions of primary server 62, backup server 70 and replication link 78, and by extension the various types of hardware that can be used to implement servers 62 and 70, will become apparent in the discussion below.

Figure 2:
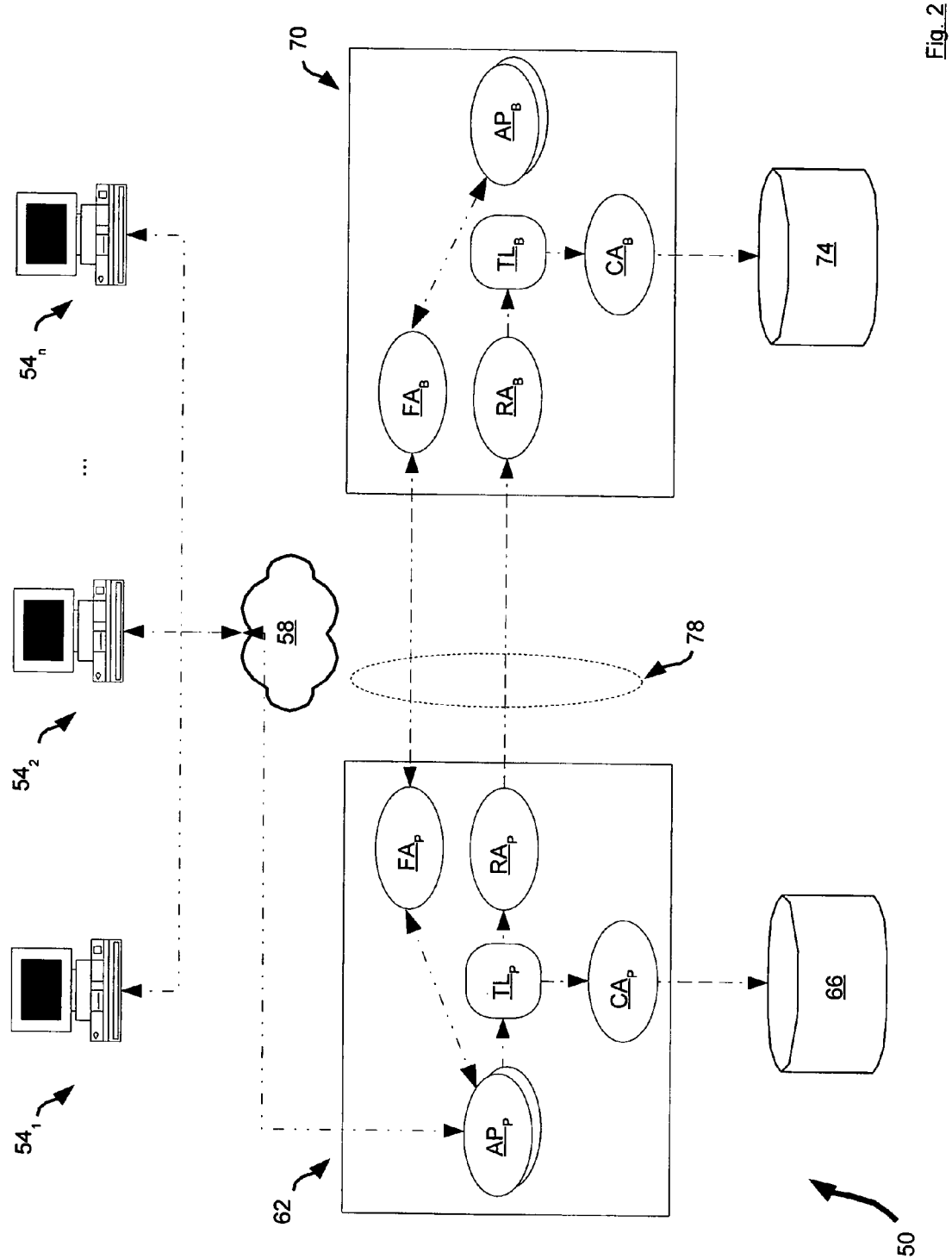
FIG. 2 shows the system of FIG. 1 in the normal state and includes exemplary details of various software elements executing on the servers of FIG. 1.

Referring now to FIG. 2, servers 62 and 70 of system 50 are shown in greater detail. Also of note, the various connections in FIG. 2 are shown in dashed lines, to denote virtual connections between various elements in system 50, in contrast to the solid line connections in FIG. 1, which denote the physical connections between various elements of system 50. Thus, such connections as shown in FIG. 2 are intended to denote system 50 operating in a normal state whereby primary server 62 and backup server 70 are both operational, with primary server 62 servicing requests from clients 54. Further details about this state, and other states in which system 50 can operate, will be provided below.

Referring still to FIG. 2, primary server 62 and backup server 70, each include a plurality of software elements that execute on their respective hardware environments to provide failover functionality. More particularly, primary server 62 includes at least one application process $AP_P$ that receives and processes requests from various clients 54. Application process $AP_P$ can thus be any type of application to which it can be desired to provide failover protection. By the same token, backup server 70 also includes application process $AP_B$, which in the normal state shown in FIG. 2 is executing 'warm' on backup server 70, in that application process $AP_B$ is ready and available to receive and process requests from clients 54, but in the normal state depicted in FIG. 2, application process $AP_B$ is not as yet performing such reception and processing of requests.

Primary server 62 also includes a transaction log $TL_P$ that in a present embodiment resides in volatile memory (i.e. random access memory) of primary server 62. Requests that are processed by application process $AP_P$ are executed as a sequence of discrete ACID transactions. Thus, during the execution of a transaction by application process $AP_P$, the details of the transaction are prepared as a transaction record that is written to transaction log $TL_P$. The details of the transaction typically includes changes made to the database tables and queues that are used to track the requests and otherwise facilitate the processing performed by system 50.

Transaction log $TL_P$ also connects to a checkpoint agent $CA_P$ which in turn connects to primary non-volatile storage 66. Transaction log $TL_P$ and checkpoint agent $CA_P$ cooperate to periodically flush the contents of transaction log $TL_P$ to primary non-volatile storage 66. The criteria to determine when to flush (i.e. save) the contents of transaction log $TL_P$ to primary non-volatile storage 66 depends on the state in which system 50 is operating. In the normal state shown in FIG. 2, the flushing of transaction log $TL_P$ to primary non-volatile storage 66 is performed at varying intervals. Such intervals can be based on any desired criteria, such as at a fixed time interval, or when a predetermined number of transaction records is received, or when random access memory needs to be freed for other purposes. In other states of system 50, such as when primary system 62 is operational but backup system 70 has failed, then the flushing of transaction log $TL_P$ to primary non-volatile storage 66 is performed after each transaction that is processed by application process $AP_P$.

Primary server 62 also includes a replication agent $RA_P$ that is also connected to transaction log $TL_P$. Backup server 70 also includes a replication agent $RA_B$ that communicates with a backup transaction log $TL_B$ also resident in backup server 70. In turn, backup transaction log $TL_B$ connects to its own checkpoint agent $CA_B$. Similar to transaction log $TL_P$ and checkpoint agent $CA_P$, transaction log $TL_B$ and checkpoint agent $CA_B$ cooperate to periodically flush the contents of transaction log $TL_B$ to backup non-volatile storage 74. Thus, in the normal state of system 50 in FIG. 2, transaction log $TL_P$, replication agent $RA_P$, replication agent $RA_B$ and transaction log $TL_B$ cooperate to maintain duplicate or mirror copies of the transactions being committed by application process $AP_P$, and further cooperate to periodically flush the contents of those transactions to non-volatile storage 66 and non-volatile storage 74.

Primary server 62 and backup server 70 also each respectively include a primary failover agent $FA_P$ and a backup failover agent $FA_B$. Failover agent $FA_P$ and failover agent $FA_B$ are operable to periodically test the integrity of link 78 and each other. In a present embodiment, failover agent $FA_P$ will periodically deliver a keep-alive signal (e.g. "Are you alive?") to failover agent $FA_B$, to which failover agent $FA_B$ is expected to periodically respond (e.g. "Yes I am"). Provided such requests are responded to by failover agent $FA_B$, and provided primary server 62 continues to operate normally, then system 50 will remain in the state shown in FIG. 2. Thus, failover agent $FA_P$ is also operable to communicate with application process $AP_P$ to indicate that the normal state is in effect.

It should now be apparent that failover agent $FA_P$, failover agent $FA_B$, replication agent $RA_P$ and replication agent $RA_B$ are operable to make use of both main link 82 and failsafe link 86 that together comprise link 78, as appropriate or as otherwise desired. In this manner, system 50 can remain in the normal state as long as at least one of main link 82 and failsafe link 86 are operational.

Figure 3:
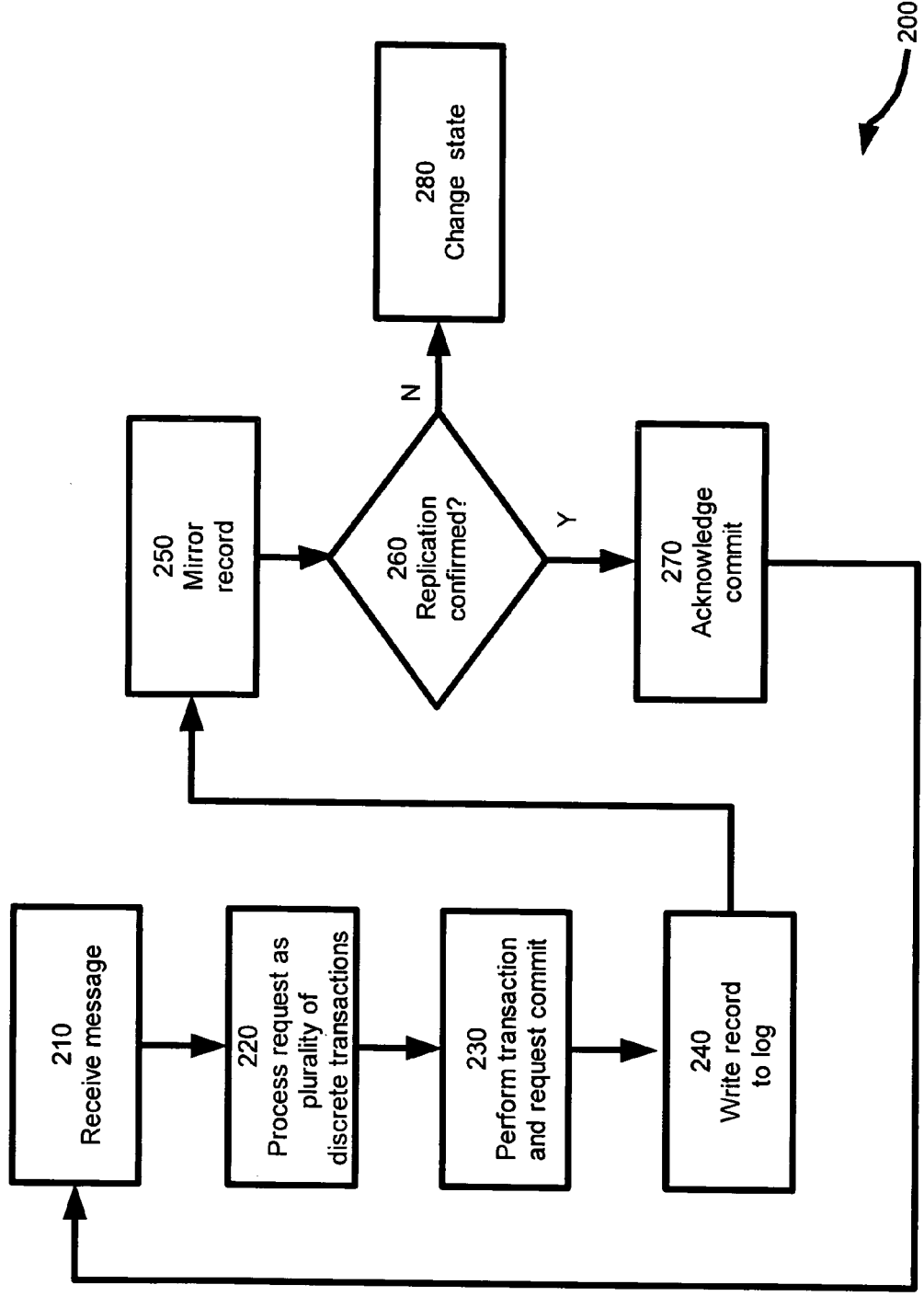
FIG. 3 show a flow-chart depicting a method for processing requests in accordance with another embodiment of the invention.

Referring now to FIG. 3, a method for processing requests during a normal state in accordance with another embodiment of the invention is indicated generally at 200. In order to assist in the explanation of the method, it will be assumed that method 200 is operated using system 50. Furthermore, the following discussion of method 200 will lead to further understanding of system 50 and its various components. However, it is to be understood that system 50 and/or method 200 can be varied, and need not work exactly as discussed herein in conjunction with each other, and that such variations are within the scope of the present invention. Accordingly, for the purposes of describing method 200 it is assumed that system 50 is currently in the normal state shown in FIG. 2.

Figure 4:
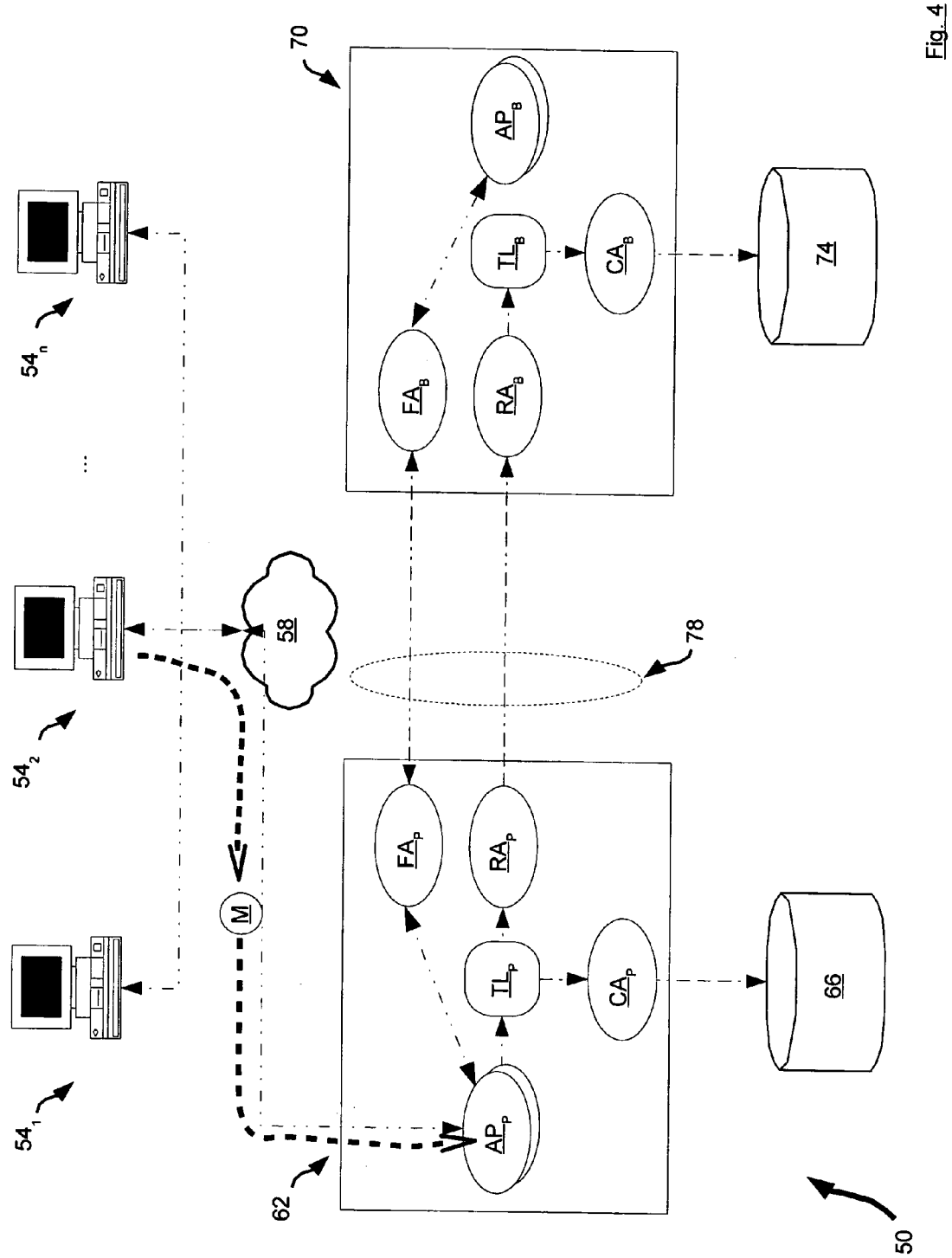
FIG. 4 shows the system of FIG. 2 during operation of certain steps in the method of FIG. 3.

Beginning first at step 210, messages are received. FIG. 4 shows an example of how step 210 can be performed, with client $54_2$ generating a message M and sending that message over Network 58 for reception by application process $AP_P$. Message M can have any desired format, but for purposes of explaining method 200, Table I shows an example format of message M.

TABLE I

Example format of message M

| Field # | Field | Data |
|---|---|---|
| 1 | Client ID | Client $54_2$ |
| 2 | Message ID | 0001 |
| 3 | Message Body | X |

Thus, Field 1 of Table 1, "Client ID" contains an address or other identifier of client $54_2$ with system 50. In the example of Table I, Client ID is simply populated with the data "client $54_2$" but more typically, Client ID will include a user-id, and/or an Internet Protocol ("IP") address of client $54_2$. Field 2 of Table 1, "Message ID" contains an identifier to allow the elements in system 50 to distinguish this particular message from client $54_2$ from other messages from client $54_2$ that may now or in the future be generated by client $54_2$. Typically, Message ID will be a sequence number, incrementing for each message generated by client $54_2$. In the example of Table I, Message ID is simply populated with the data "0001". Field 3 of Table 1, "Message Body" contains a service request, or another type of request or any other type of information that can be generated by a client 54 for processing by the particular application process $AP_P$. In the example of Table I, Message Body is simply populated with the data "X", to generically denote such a message. For example, where application process $AP_P$ is for processing financial transactions, then "X" can be a request to buy or sell a particular item.

Figure 5:
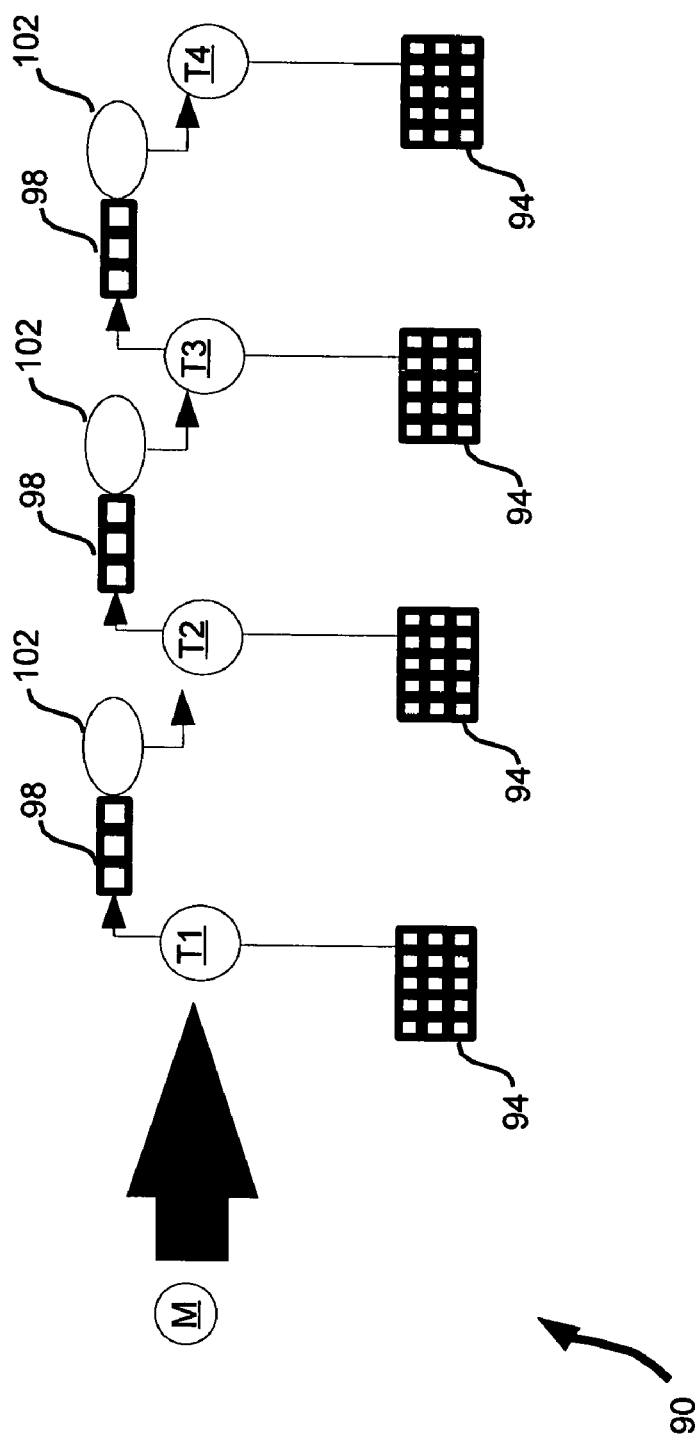
FIG. 5 shows a workflow associated with processing of messages using the system of FIG. 1.

Thus, once message M is received by application process $AP_P$, method 200 advances to step 220, at which point the message body X is processed in a manner corresponding to the design of application process $AP_P$. In the present embodiment, the message body X comprises a request, and application process $AP_P$ is configured to process the request as a number of discrete transactions performed in sequence. (In other embodiments, however, such processing could simply be in the form of a single transaction, or a plurality of transactions performed in parallel, according to whether the processing of transactions is deterministic or non-deterministic). The individual transactions thus collectively comprise a work-flow that completes the message request. A simplified example of a workflow is represented generally in FIG. 5 at 90. Workflow 90 shows message M having been processed as a number of discrete transactions T. Each transaction T, in turn, is associated with one or more database tables 94 that reside in volatile memory. Each change to a table 94, contributes to the transaction record for a particular transaction T. Each transaction T is also associated with one or more persistent queues 98 and one or more processes 102. Persistent queues 98 are used to hold a results of transaction T for eventual processing by processes 102. Processes 102, collectively form application process $AP_P$. In this manner, multiple messages M from different clients 54 can have their requests processed concurrently by making use of this configuration, as the individual transactions T for each of the requests are performed by application process $AP_P$. However, it is to be understood that workflow 90 is simplified and merely exemplary, and the way in which workflow 90 is structured is not particularly limited.

Figure 6:
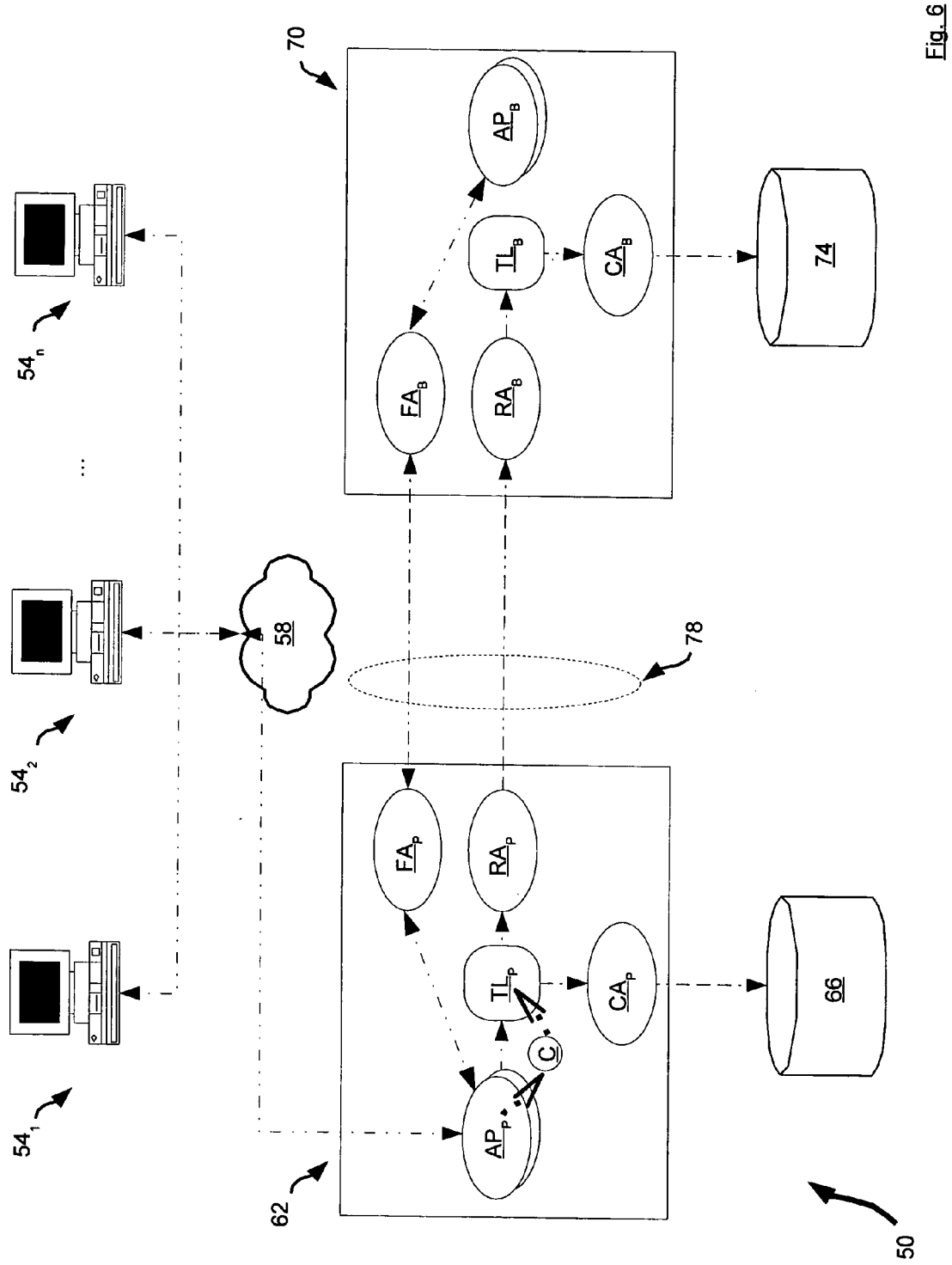
FIG. 6 shows the system of FIG. 2 during operation of certain steps in the method of FIG. 3.

At step 230, each of the transactions from step 220 are performed so that the entirety of the processing related to message body X is performed. (It should be noted that the remaining steps, 230–270 are actually performed on each of the individual transactions discussed in relation to step 220, but the remaining discussion is focused on one such transaction so as to not obscure the description of the embodiment.) Thus, where "X" represented a buy order, then application process $AP_P$ would process such an order. Having so performed the transaction, a request to commit the transaction is generated. FIG. 6 shows an example of how this part of step 230 can be performed, with application process $AP_P$ generating a commit request C and sending that message to transaction log $TL_P$.

Figure 7:
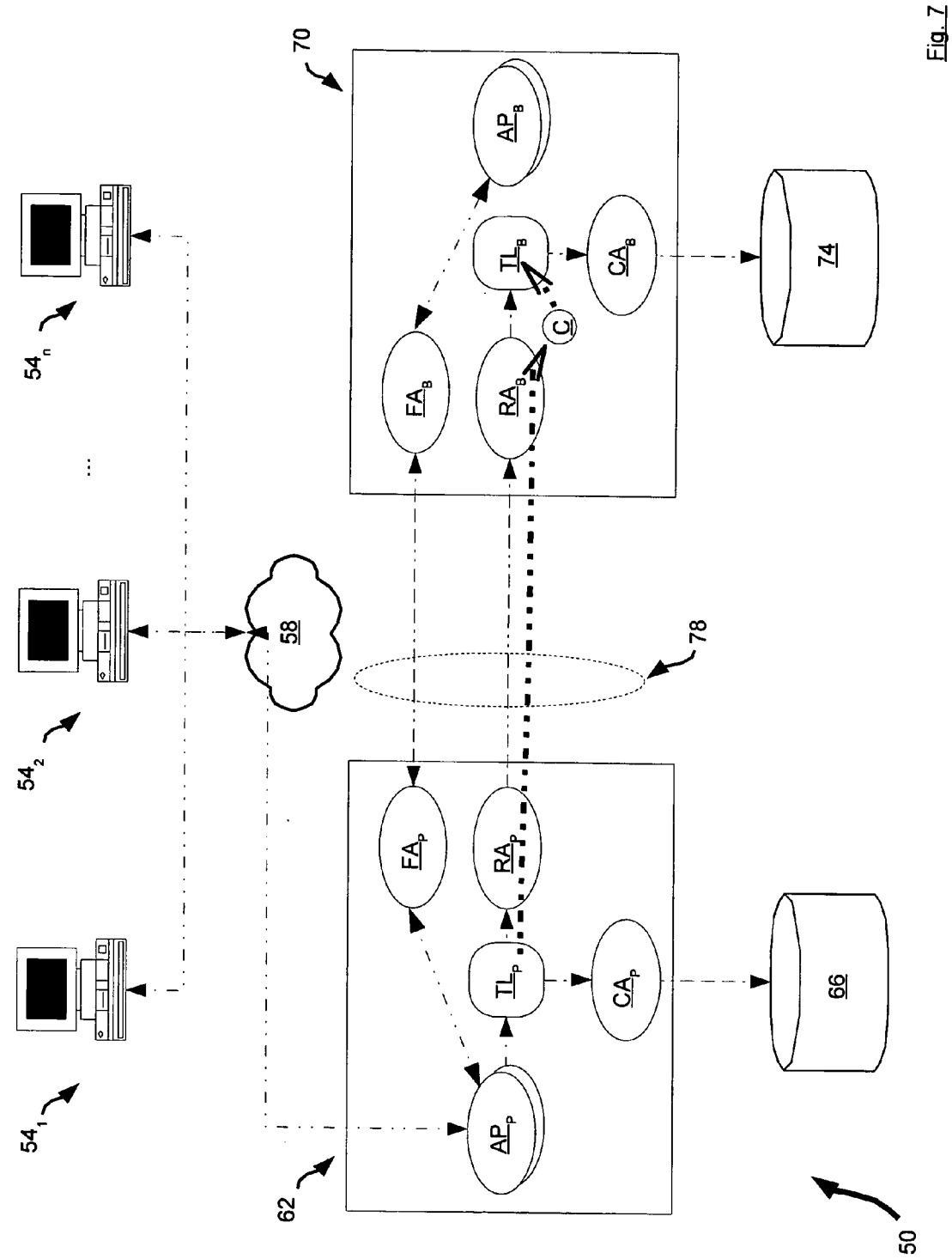
FIG. 7 shows the system of FIG. 2 during operation of certain steps in the method of FIG. 3.

At step 240, the changes associated with each of the transactions used to process the request in message body X, and a commit request C for those transactions, are written as a record to transaction log $TL_P$. Next, at step 250, the record written at step 240 is replicated or mirrored. FIG. 7 shows an example of how step 240 can be performed, with commit request C being passed to transaction log $TL_B$ via replication agents $RA_P$ and $RA_B$.

Figure 8:
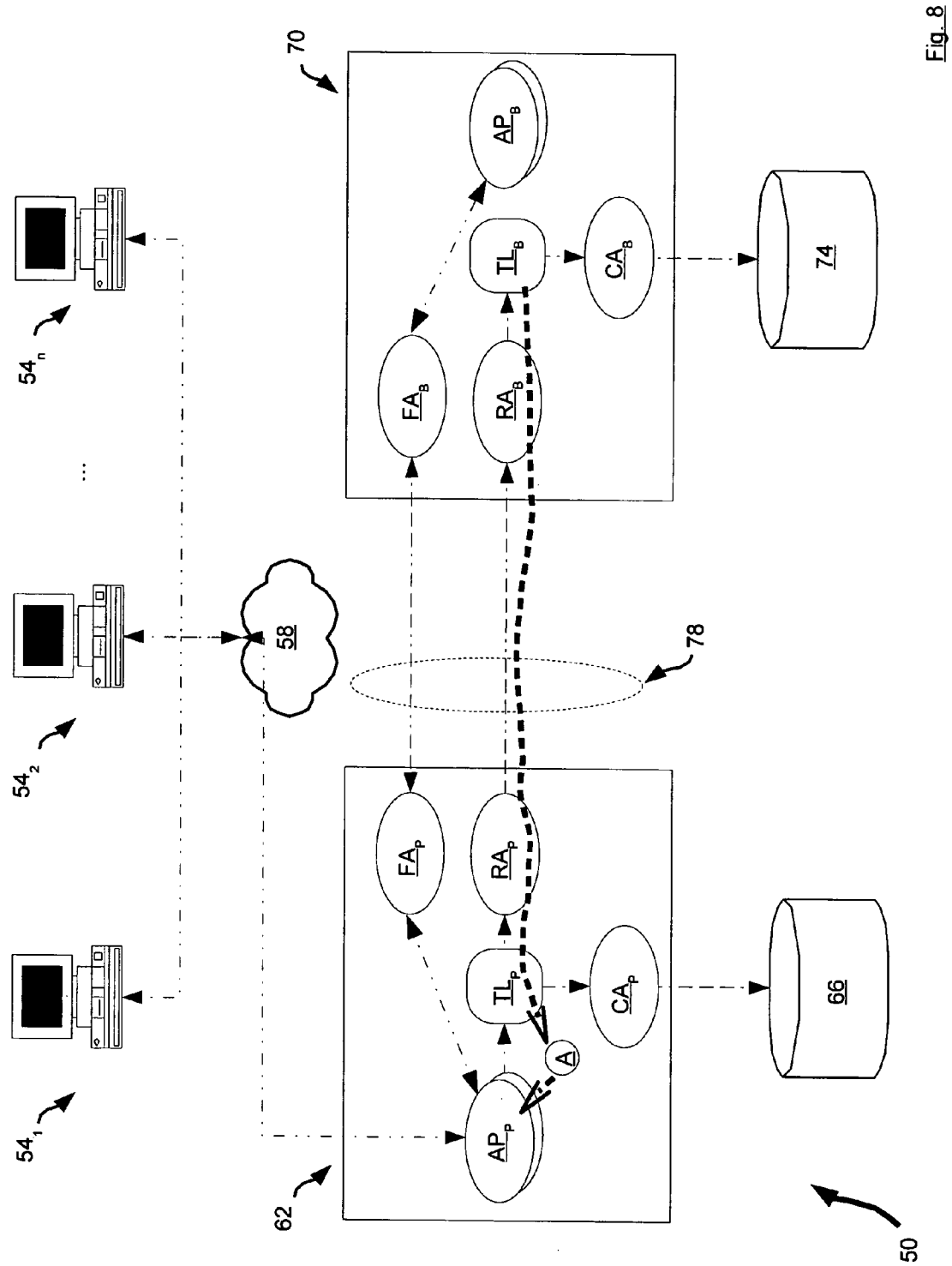
FIG. 8 shows the system of FIG. 2 during operation of certain steps in the method of FIG. 3.

At step 260, replication is confirmed. More particularly to the present embodiment, it is confirmed whether transaction log $TL_P$ and transaction log $TL_B$ were successfully changed according to commit request C. If the answer generated at step 260 is "yes", then method 200 advances to step 270, at which point the commit is acknowledged. FIG. 8 shows an example of how step 270 can be performed to achieve a "Yes", with replication agent $RA_B$ generating an acknowledge A and sending that message to replication agent $RA_P$. At this point, method 200 returns from step 270 back to step 210 and method 200 begins anew.

If however, at step 260 replication is not confirmed, then method 200 advances to step 280. Such failure can occur in a variety of ways. For example, backup server 70 can lose power or experience a crash, preventing the actual replication at step 250 or at least the confirmation thereof at step 260. In this situation, at step 280 system 50 will switch to the primary-only state, which is discussed below in relation to method 300. Alternatively, link 78 can be broken, also preventing the replication at step 250 and/or confirmation thereof at step 260, also leading system 50 to switch to the primary-only state in association with method 300. A still further possibility, though somewhat less likely, is that the portion of server 62 operating transaction log $TL_P$ fails, preventing transaction log $TL_P$ from being updated, even though all other aspects of server 62 and system 50 are functioning normally. In this situation, at step 280 system 50 will switch to the backup-only state, which is discussed below in relation to method 400. (Of note, while not explicitly discussed herein, it should now be understood that other types of states can be invoked at step 280.)

Concurrent with the performance of method 200, checkpoint agent $CA_P$ will, at various intervals, flush the contents of transaction log $TL_P$ to non-volatile storage 66, while checkpoint agent $CA_B$ will periodically flush the contents of transaction log $TL_B$ to non-volatile storage 74. It should be noted that checkpoint agents CA can perform their functions independently of each other, and need not flush at the same time. Checkpoint agent $CA_B$ will also periodically update all of the tables 94 and queues 98 in backup server 70 based on the record(s) in transaction log $TL_B$. The intervals when such flushing occurs need not depend on the performance of method 200, and can thus be performed substantially independently from method 200. The intervals can be based on pre-set time periods, or a predefined number of transaction records being held in volatile memory, or can even be based on the amount of random access memory being occupied by each transaction log TL such that flushes to non-volatile storage are performed as a means of freeing up such random access memory. Other intervals and/or criteria to be used for flushing the contents of each transaction log TL will now occur to those of skill in the art.

Figure 9:
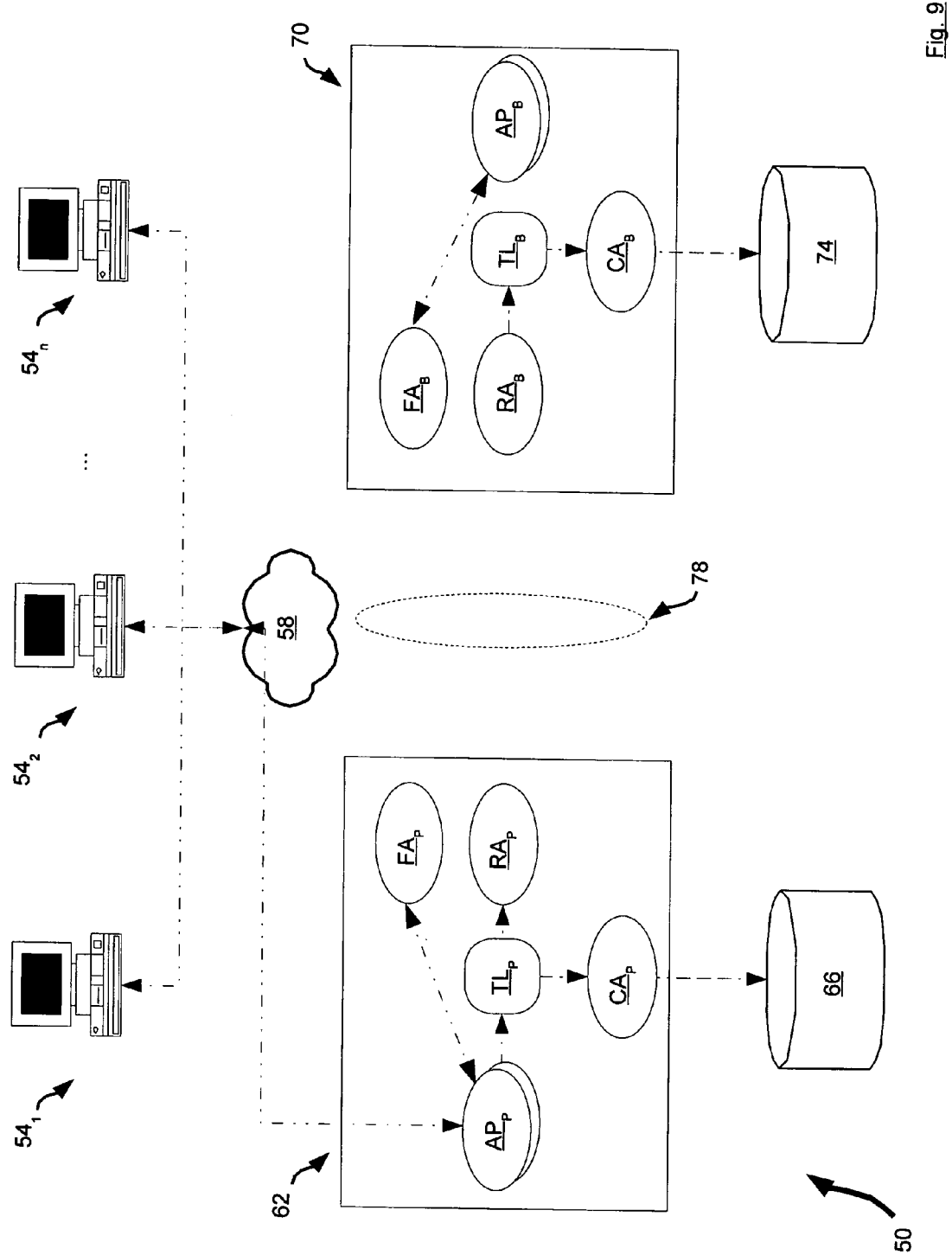
FIG. 9 shows the system of FIG. 1 in the primary-only state and includes exemplary details of various software elements executing on the servers of FIG. 1.

Referring now to FIG. 9, servers 62 and 70 of system 50 are shown in greater detail, but in FIG. 9 system 50 is shown operating in the primary-only state. Thus, the various connections in FIG. 9 are shown in dashed lines, to denote virtual connections between various elements in system 50. Thus, such connections as shown in FIG. 9 are intended to denote system 50 operating in a primary-only state whereby primary server 62 is operational, but where backup server 70 is unavailable, either due to a failure of backup server 70 and/or due to a failure of link 78. Thus, in FIG. 9 only primary server 62 is servicing requests from clients 54, and without access to the backup services of backup server 70.

Figure 10:
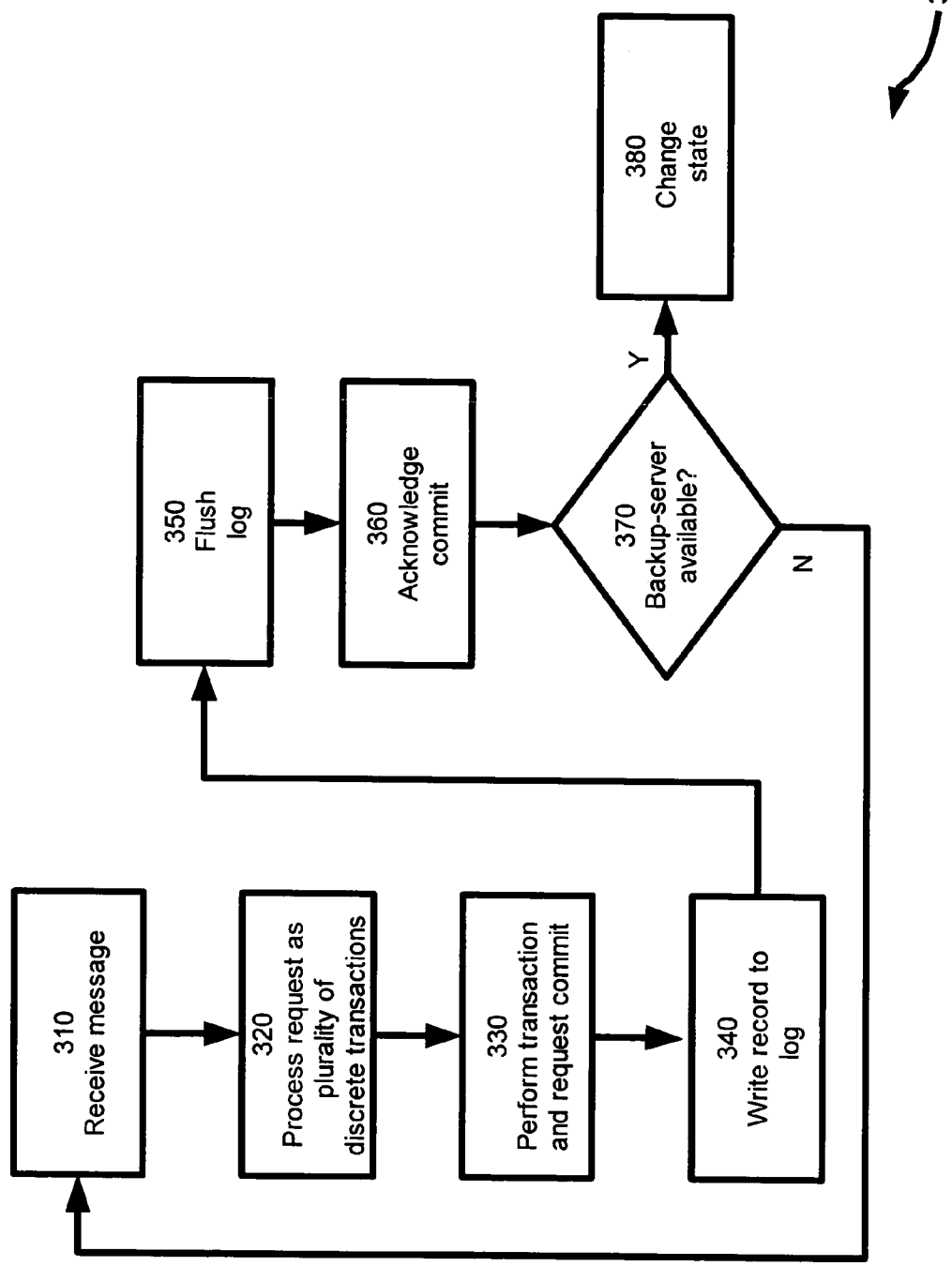
FIG. 10 shows a flow chart depicting a method for processing requests in accordance with another embodiment of the invention.

Referring now to FIG. 10, a method for processing requests during a primary-only state in accordance with another embodiment of the invention, is indicated generally at 300. It will be assumed that method 300 is operated using system 50, and the following discussion of method 300 will lead to further understanding of system 50, but it is to be understood that system 50 and/or method 300 can be varied.

For the purposes of describing method 300 it is assumed that system 50 is currently in the primary-only state shown in FIG. 9.

In general, steps 310–330 will be performed substantially the same way as steps 210–230. However, at step 340 method 300 begins to differ from method 200, as the transaction records are only written to primary transaction log $TL_P$. At step 350, the changes to transaction log $TL_P$ written at step 340 are immediately flushed to non-volatile storage 66 by checkpoint agent $CA_P$. At step 360, the commit requested at step 330 is acknowledged, whereby transaction log $TL_P$ will return an acknowledgement to application process $AP_P$, in much the same way an acknowledgment is returned at step 270 of method 200, but wherein such acknowledgment does not include any acknowledgment from backup server 70.

Next, at step 370 a determination is made as to whether backup server 70 has become available. Step 370 will typically be performed by failover agent $FA_P$ which will attempt to communicate with failover agent $FA_B$ to see if link 78 is now active and/or whether backup server 70 is back online. Thus, if at step 370, it is determined that backup server 70 is now available, then method 300 advances to step 380 at which point the state is changed. More particularly, the primary-only state of system 50 in FIG. 9 will change to the normal state of system 50 in FIG. 2. At this point, method 200 can begin operating to process messages from clients 54.

It should be understood that many modifications to method 300 are possible. In particular, it should be noted that steps 370 and 380 can be eliminated altogether, in favour of having a system administrator (or other IT professional operating system 50) power-down and then bring up system 50, manually modifying transactions logs TL and non-volatile storage devices 66 and 74 to synchronize their states. Alternatively, where step 370 is used, then it will be understood that at step 380 transaction logs TL and non-volatile storage devices 66 and 74 will be synchronized, preferably, though not necessarily, in an automated fashion, prior to the recommencement of method 200.

Figure 11:
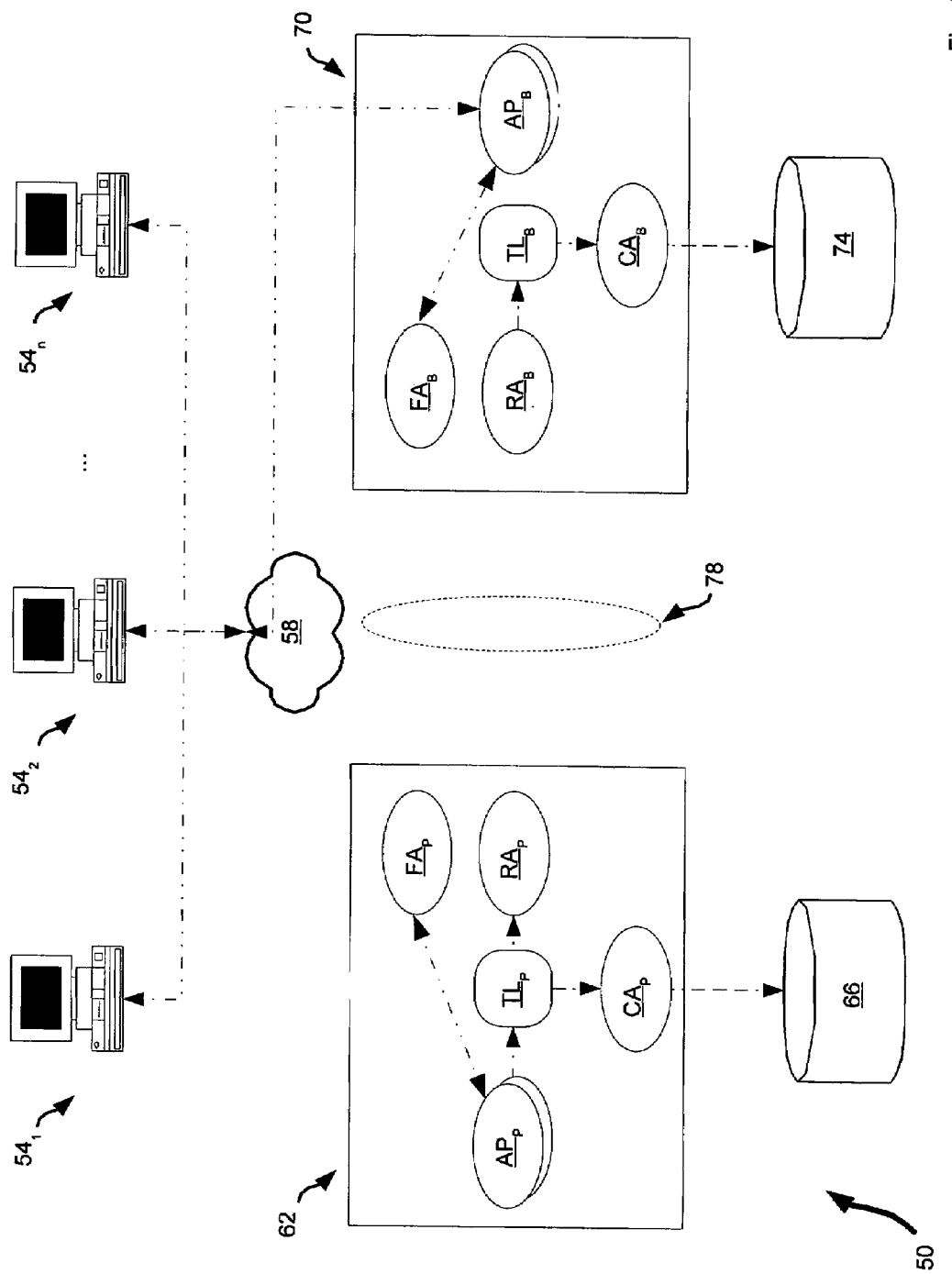
FIG. 11 shows the system of FIG. 1 in the backup-only state and includes exemplary details of various software elements executing on the servers of FIG. 1.

Referring now to FIG. 11, servers 62 and server 70 of system 50 are shown in greater detail, but in FIG. 11 system 50 is shown operating in the backup-only state. Thus, the various connections in FIG. 11 are shown in dashed lines, to denote virtual connections between various elements in system 50. Thus, such connections as shown in FIG. 11 are intended to denote system 50 operating in a backup-only state whereby backup server 70 is operational, but where primary server 62 is unavailable, typically due to a failure of primary server 62, and/or a connection between primary server 62 and network 58. Thusly, in FIG. 11 only backup server 70 is servicing requests from clients 54.

Figure 12:
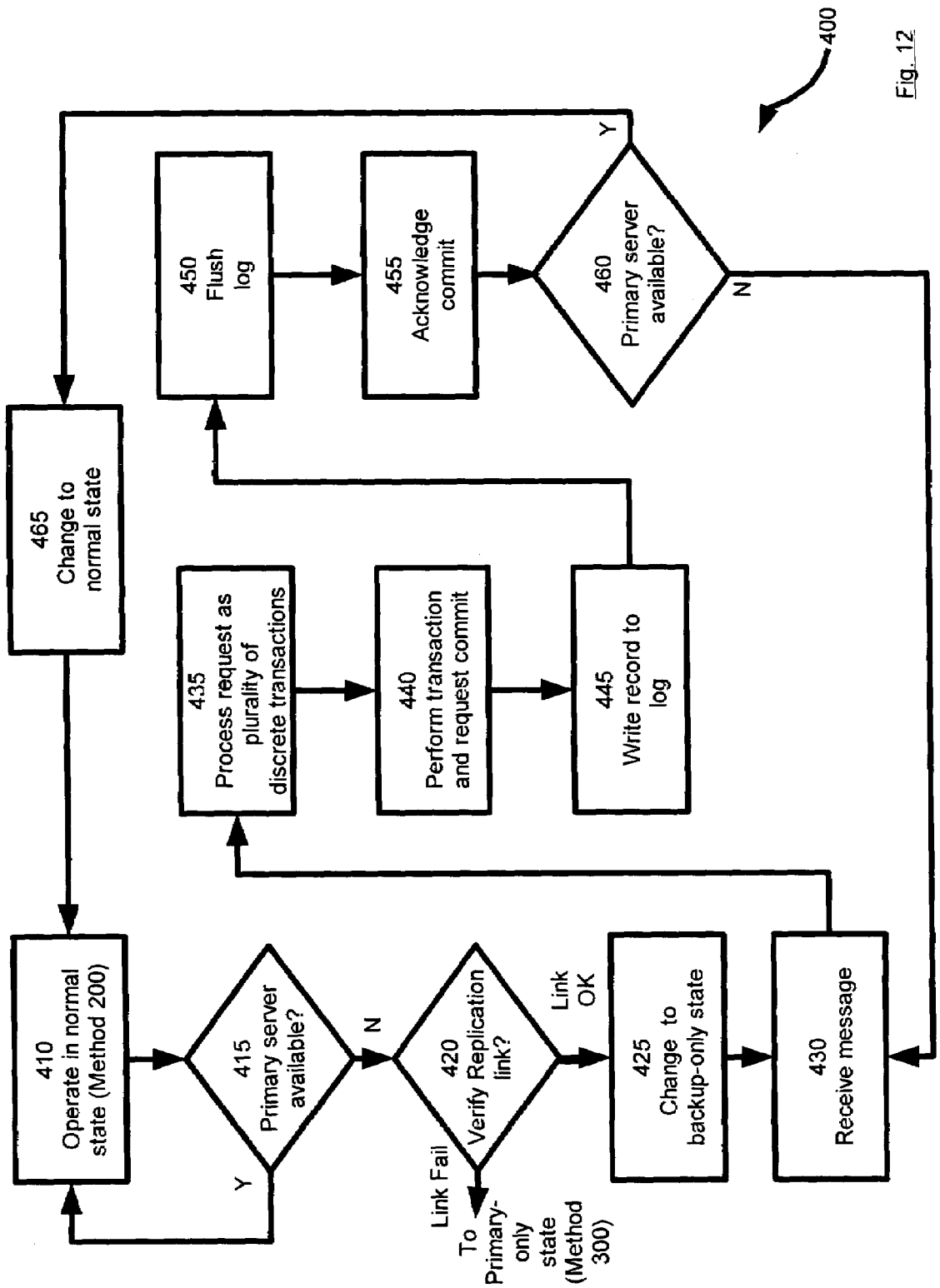
FIG. 12 shows a flow chart depicting a method for processing requests in accordance with another embodiment of the invention.

Referring now to FIG. 12, a method for processing requests during a backup-only state in accordance with another embodiment of the invention, is indicated generally at 400. It will be assumed that method 400 is operated using backup server 70 of system 50, and the following discussion of method 400 will lead to further understanding of system 50, but is to be understood that system 50 and/or method 400 can be varied.

Beginning at step 410, it is assumed that system 50 is operating in the normal state shown in FIG. 2 and using method 200. However, at step 415, a determination by backup server 70 is made as to whether primary server 62 is available. In system 50, step 415 is performed by failover agent $FA_B$ of backup server 70, which relies on the presence of the previously described "keep-alive" signal between primary server 62 and backup server 70 along link 78 to determine that "yes" primary server 62 is still available. Thus, if at step 415 it is determined that "yes", primary server 62 is available, then method 400 cycles back to step 410.

However, if, at step 415, failover agent $FA_B$ of backup server 70 fails to detect the keep-alive signal, then at step 415 it is determined that "no", primary server 62 is unavailable, and method 400 advances to step 420. Such a determination could be made for a number of reasons. For example, if primary server 62 fails then it will be determined that primary server 62 is unavailable. It should be noted that the failure of primary server 62 can occur in a number of ways. Primary server 62 could completely shut down and thus fail to maintain the "keep-alive" signal, or a portion of primary server 62 could fail and thereby indicate that failover agent $FA_P$ should identify such a failure to failover agent $FA_B$, and expressly request that backup server 70 assume responsibility for processing messages for clients 54.

At step 420, the integrity of the replication link is verified. In this event, backup server 70 can attempt to communicate with primary server 62 via Network 58 to see if primary server 62 is still operational, and, if during such communication it is determined that server 62 is still operational, but that link 78 has failed, then the answer returned at step 420 will be "Link Failure" and backup server 70 can simply flush the contents of transaction log $TL_B$ to non-volatile storage 74 and enter a wait state. Backup server 70 can then wait for reactivation of link 78 while system 50 enters the primary-only state in FIG. 9, and whereby messages from clients 54 are processed using method 300 of FIG. 10. However, if it is determined at step 420 that the replication link 78 is "ok", (i.e. that primary server 62 has failed), then method 400 will advance to step 425.

Figure 13:
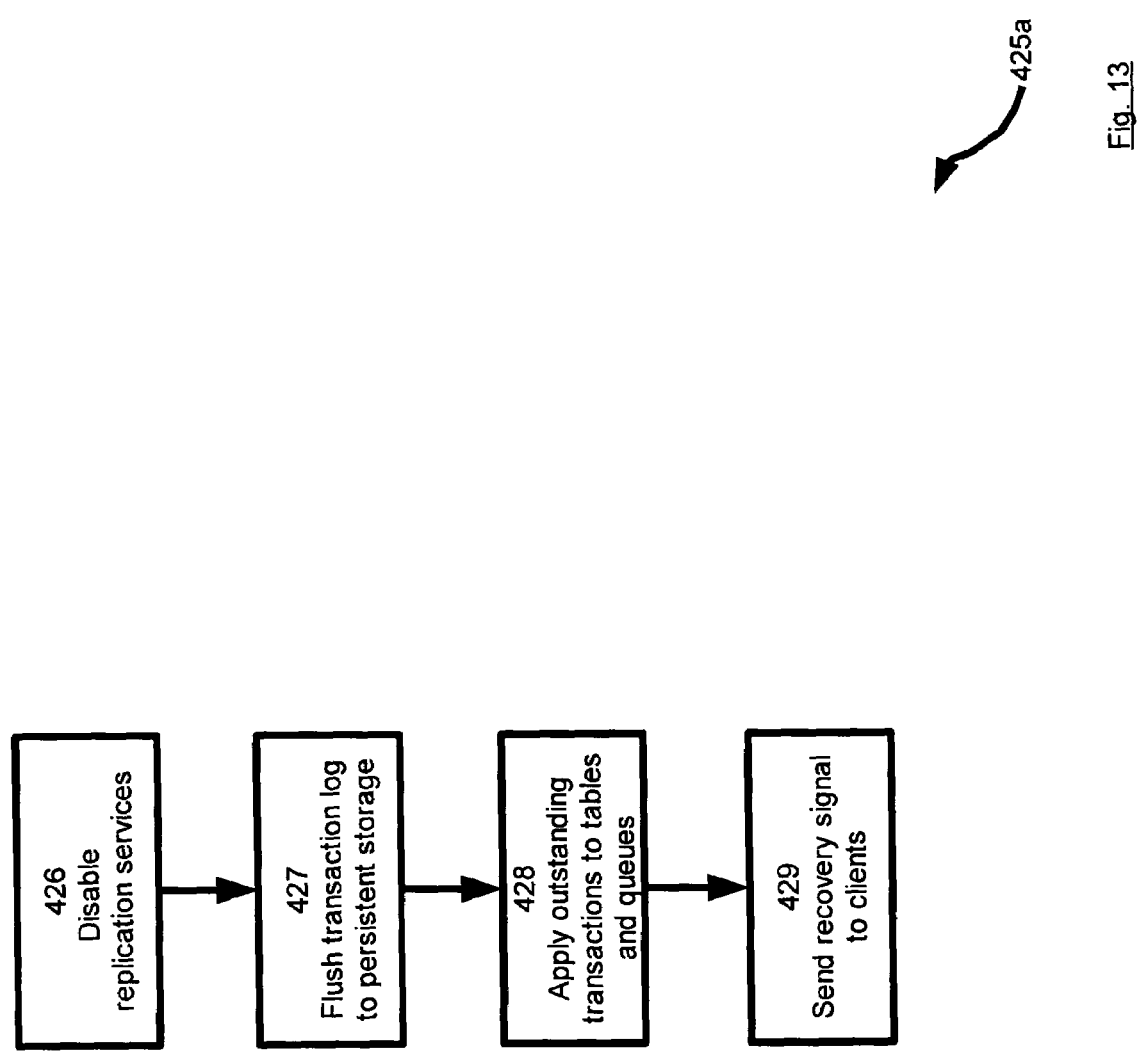
FIG. 13 shows a flow-chart depicting a set of sub-steps that can be used to perform one of the steps shown in FIG. 11.

Thus, at step 425, backup server 70 will switch itself to the backup-only state. In a present embodiment, backup server 70 will immediately flush transaction log $TL_B$ to non-volatile storage 74. Additionally, backup server 70 will recreate the data environment as it existed on primary server 62 at the time of failure, using the transaction log of flushed transaction records stored on non-volatile storage 74. Further, failover agent $FA_B$ will bring application process $AP_B$ out of its "warm" state into a hot state, and otherwise prepare backup server 70 to receive messages from clients 54. FIG. 13 shows one specific example of how step 425 can be performed, and includes a method of sub-steps for performing step 425, indicated generally at 425a. At step 426, replication services are disabled. More specifically, backup server 70 will disable replication agent $RA_B$, and will cease performing those steps of method 200 wherein backup server 70 cooperates with primary server 62 in order to mirror transaction log $TL_P$ in transaction log $TL_B$. Next, at step 427, checkpoint agent $CA_B$ flushes the contents of transaction log $TL_B$ to non-volatile storage 74. At step 428, any outstanding transactions are applied to appropriate tables 94 and queues 98. Typically, step 428 is performed by application process $AP_B$ as part of transitioning application process $AP_B$ from "warm" to "hot" state. Finally, at step 429, a recovery signal is sent to clients 54, which is effectively a signal from backup server 62 that it is now able to assume responsibility for receiving messages from clients 54.

At step 430, backup server will begin to receive messages from clients 54. It should be noted that, in a present embodiment, such message requests will automatically start being delivered to backup server 70 once clients 54 fail to communicate with primary server 62 and are subsequently informed that backup server 70 is available. More particularly, each client 54 will be provided with a network address for both server 62 and server 70 prior to commencement of method 200. Further, as part of the performance of step 210 of method 200, or step 310 of method 300, application process $AP_P$ will send acknowledgements to the originating client 54. Thus when a client 54 fails to have a message delivery acknowledged, (or detects a loss of a keep-alive signal between the client 54 and server 62), then that client 54 will utilize the address of backup server 70. Once backup server 70 indicates to client 54 that it has completed its recovery and is 'ready', then client 54 will start to deliver that message (and all messages for which no update, (i.e. an indication of completion of processing) by primary server 62 was received) to application process $AP_B$ of backup server 70. It should also be noted that, during initial communication between clients 54 and backup server 70, each client 54 and backup server 70 will perform some initial comparisons of Message IDs (or sequence numbers) from client 54 with processing results that were previously performed by primary server 62 during normal state and stored on backup server 70 to ensure no duplicates exist and thereby further ensure that no requests are performed twice. A more detailed discussion of how client 54 can behave in relation to step 430 will be provided in greater detail below in relation to method 500.

Method 400 then cycles through steps 435–455, which operate on backup server 70, but are performed substantially in the same way as steps 320–360 in method 300. At step 460, backup server 70 will check again (via failover agent $FA_B$) whether primary server 62 has become available, and if, so, method 400 advances to step 465 where steps are taken to reactivate primary server 62 and then return system 50 to the normal state and regular operation under step 410. Such steps will include the synchronizing of transaction logs TL and non-volatile storage devices 66 and 74 according to the activities of backup server 70. However, if at step 460 backup server 70 determines that primary server 62 is still unavailable, then method 400 will return to step 430 to receive further messages from clients 54.

It should be understood that many modifications to method 400 are possible. In particular, it can be desired to collapse steps 415 and 420 as a single decision, wherein backup server 70 will simply proceed to step 425 if communication with primary server 62 is lost, regardless of whether the communication failure was due to a failure of primary server 62 or a failure of link 78. Where the loss of communication is simply due to a failure of link 78, and yet primary server 62 is continuing to operate normally, then system 50 will enter primary-only mode and operate method 300, while backup server 70 will simply wait to receive messages at step 430, but will not actually receive any such messages, as those messages are continuing to be processed by primary server 62 in accordance with method 300. When performing this modification it should now be understood that step 460 can also be eliminated. In certain applications, it may be preferred to employ this modification, and to perform these steps manually in order to reduce the time needed to reactivate system 50.

Figure 14:
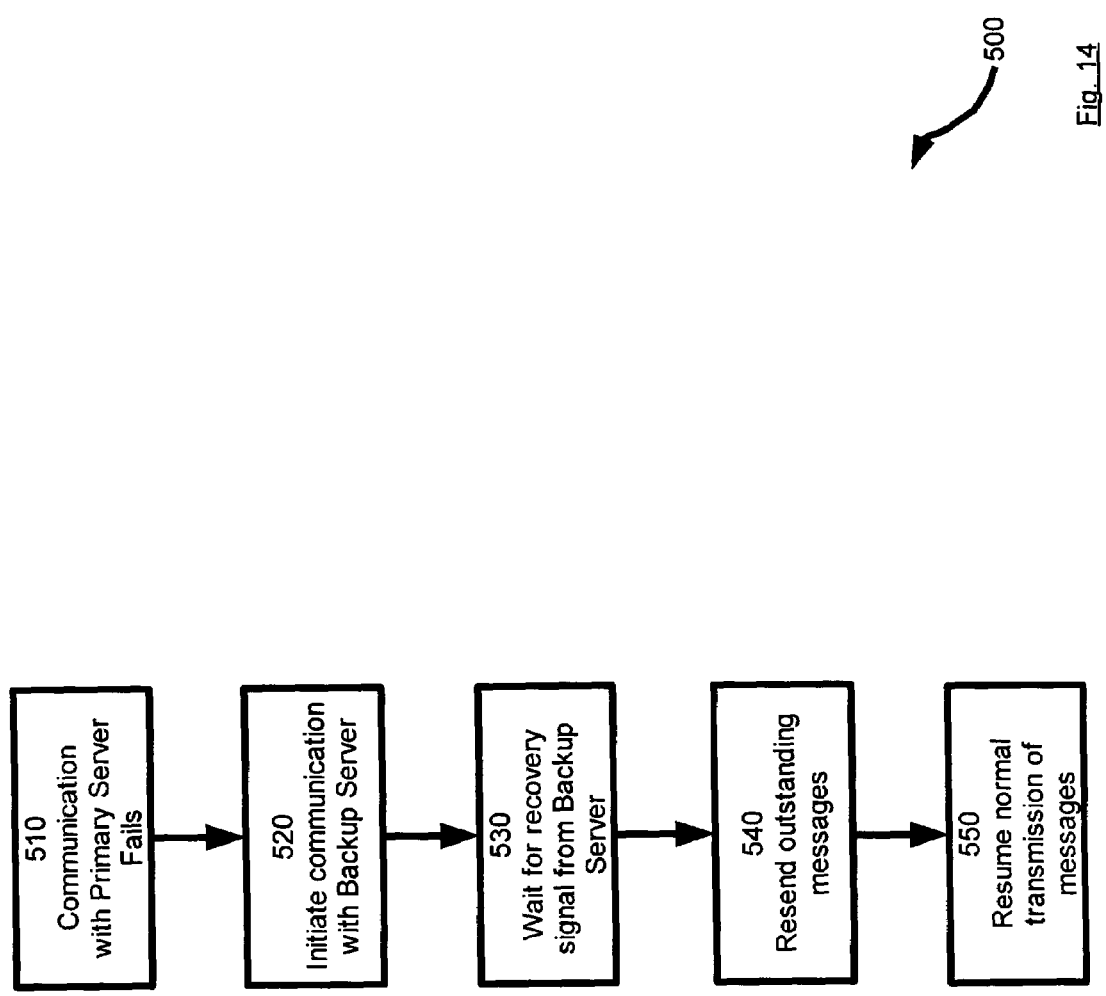
FIG. 14 shows a flow-chart depicting a method of switching a client from a primary server to a backup server in accordance with another embodiment of the invention.

Referring now to FIG. 14, a method for switching a client from a primary server to backup server in accordance with another embodiment of the invention, is indicated generally at 500. Method 500 can be particularly suitable for operation by one of clients 54 as system 50 transitions between method 200 and method 400. Method 500 can be complimentary to steps 425 and step 430 of method 400, and also to method 425a. Beginning at step 510, a client 54 experiences a failure of communication with primary server 62. This can occur in a number of ways, such as a failure by primary server 62 to respond to a message that is delivered by client 54 or a failure of a "keep-alive" signal being sent between that client 54 and server 62.

However the failure is experienced, method 500 then advances to step 520, at which point client 54 attempts to initiate communications with backup server 70. This is typically implemented by providing clients 54 with the network address of both primary server 62 and primary server 70, such that clients 54 are prepared for a failure of primary server 62 and are able to initiate method 500 to fail over to backup server 70.

At step 530, clients 54 will remain in a wait state until backup server 70 provides a recovery signal, or other signal that indicates that backup server 70 is ready to start processing messages from clients 54. Such a recovery signal from backup server 70 can be generated by backup server 70 according to, for example, step 429 of method 425a.

Once the recovery signal is received from backup server 70, method 500 advances to step 540, at which point the client 54 will resend any outstanding requests to application process $AP_B$ of backup server 70. Next, method 500 advances to step 550, at which point client 54 resumes normal transmission of requests, only now all requests are directed (again as embedded in a message from client 54) to application process $AP_B$ of backup server 70.

Figure 15:
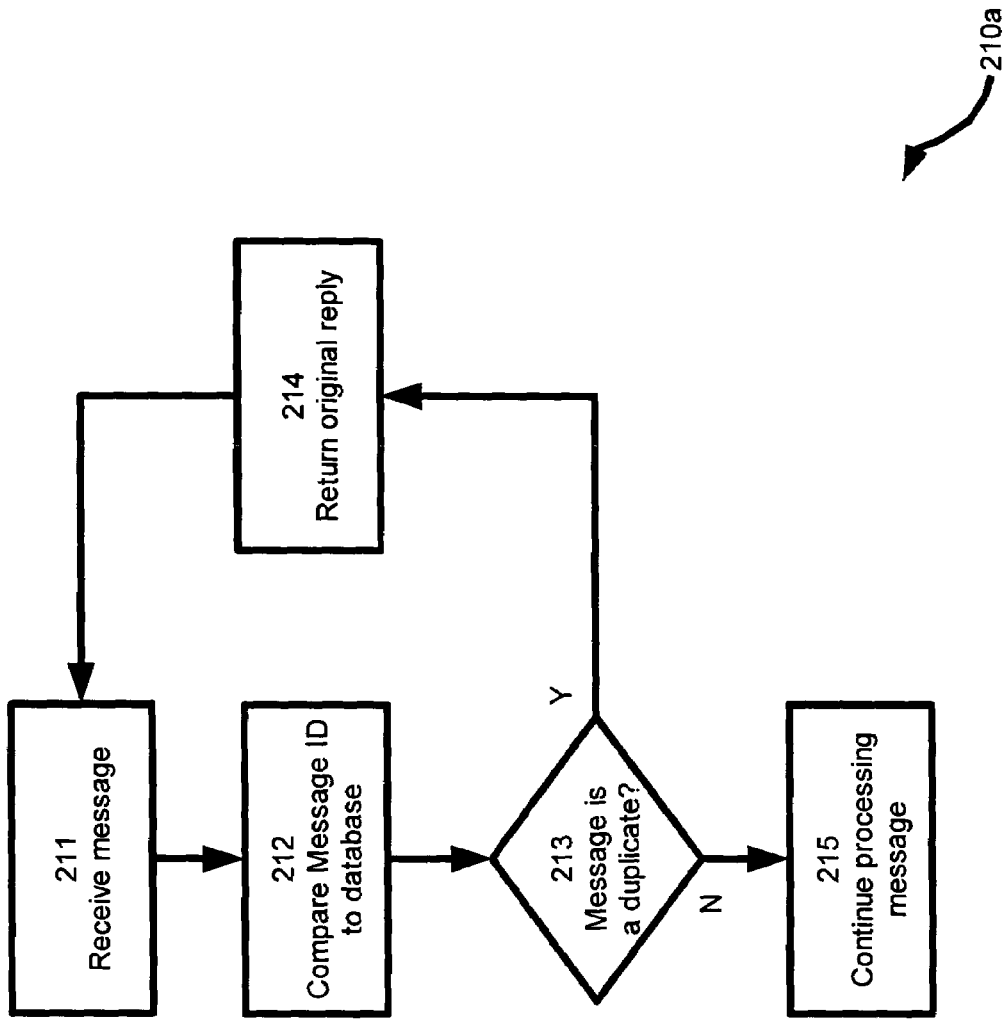
FIG. 15 shows a flow-chart depicting a set of sub-steps that can be used to perform the receiving steps shown in the methods of FIG. 3, 10, or 12; and, FIG. 16 shows a flow-chart depicting a set of sub-steps that can be used to perform the mirror recording steps shown in the method of FIG. 3.

While only specific combinations of the various features and components of the present invention have been discussed herein, it will be apparent to those of skill in the art that desired subsets of the disclosed features and components and/or alternative combinations of these features and components can be utilized, as desired. For example, step 210 "Receive Messages" of method 200 can be performed in a number of sub-steps to enhance functionality of method 200. Likewise, step 310 and step 430 can also be so modified. Referring now to FIG. 15, a method of sub-steps for performing step 210 is indicated generally at 210a. At step 211, the message is received. Step 211 occurs much as previously described with regard to step 210 of method 200. At step 212, the Message ID of the message M is compared with a database on primary server 62 of previously received Message ID's corresponding to that client. At step 213, if it is determined that the message M received at step 211 is a duplicate, then the method advances to step 214 at which point the reply originally generated in response to that message M is sent again to the originating client 54. However, if it is determined that the message is not a duplicate, then the method advances to step 215 and the message M is processed as previously described, with method 200 advancing to step 220.

It should now be apparent that method 210a can be modified as a means to effect step 310 or step 430, as the context requires. Of particular note, it is contemplated that a client 54 may be quite likely to send duplicate messages to backup server 70 as part of client 54 executing method 500 in a failover from primary server 62 to backup server 70. Thus, as client 54 performs step 540 of method 500 and resends outstanding messages to backup server 70, such outstanding messages may in fact be duplicates—i.e. messages that were successfully processed by server 62, and mirrored by server 70, but for which server 62 was unable to acknowledge to client 54. Thus, method 210a can be used to effect step 430 of method 400 in order to manage such duplicate requests.

Figure 16:
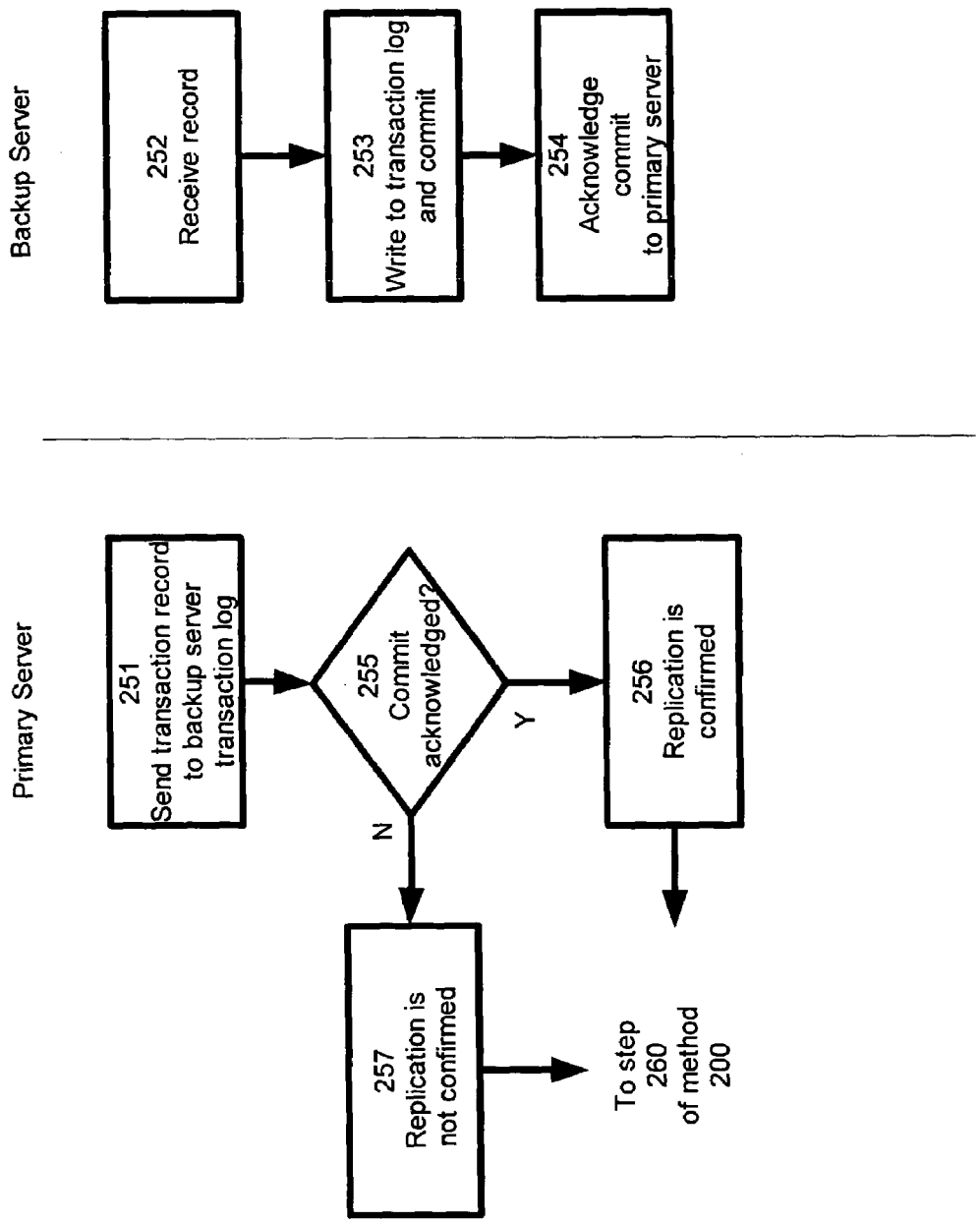

As another variation, step 250 of method 200 can also be carried out as a number of sub-steps. Referring now to FIG. 16, a method of sub-steps for performing step 250 is indicated generally at 250a. At step 251, the transaction record written at step 240 of method 200 is sent to backup server 70. At step 252, backup server 70 will receive the record, and at step 253, will write that record to its transaction log $TL_B$ and then perform a commit. At step 254, backup server 70 will acknowledge the commit by sending the acknowledgment back to primary server 62. At step 255, primary server 62 will determine if the commit was acknowledged, and, if yes, then method 250a advances to step 256 where the replication is now deemed confirmed. At this point method 250a returns to step 260, returning a confirmation of the replication to method 200. However, if it is determined at step 255 that, no, the commit was not acknowledged, then method 250a advances to step 257, and replication is not deemed confirmed. At this point method 250a returns to step 260 of method 200, returning the failure of the replication to method 200.

It is to be understood that primary server 62 and backup server 70 need not be implemented on two separate computing environments, but in fact could be implemented on a single computing environment, that includes multiple processors and which is partitioned into a virtual primary server and virtual backup server.

As another implementation, two separate servers can be divided into two partitions. The first partition of each machine can be designated a primary server, while the second partition can be designated a backup server. The primary server of the first machine is then coupled to the backup server of the second machine, and vice versa, in order to provide a double failover mechanism.

As another implementation, a plurality of backup servers can be connected to a primary server and employed to provide the potential for even higher availability of the system.

It should also be understood that the roles performed by the backup server and primary server can be reversed upon recovery of a failed primary server. For example, in the event that a primary server fails and the system fails over to a backup server, as previously described, then at such time as the primary server resumes operation, the backup server can then assume the role of the primary server and the primary server can adopt the role of the backup server.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A system for failover comprising at least one client connectable to a plurality of interconnectable servers, each of said servers operable to process messages from said client and maintain at least transaction record respective to each said message in a transaction log stored in volatile storage, and further operable to flush said transaction log to a non-volatile storage device respective to said server after each said message is processed, wherein when more than one server is available then only one of said servers processes said messages and a remainder of said servers maintain a mirror image of said transaction log, said transaction logs being flushed on a periodic basis, and wherein when only one of said servers is available then said transaction log is flushed more frequently than said periodic basis.

2. The system according to claim 1 wherein said periodic basis is an interval based on one of the criteria selected from the group consisting of a fixed time interval; a predetermined number of said transaction records having been stored in said volatile storage; and a time when said volatile storage of a respective one of said servers needs to be freed for other purposes.

3. The system according to claim 1 wherein said servers are connectable to said clients via first network and wherein said servers are interconnect able with each other via a second network.

4. The system according to claim 3 wherein said second network comprises a main link and a failsafe link.

5. The system according to claim 3 wherein said first network is selected from the group consisting of the Internet, a local area network and a wide area network.

6. The system according to claim 1 wherein said client is selected from the group consisting of a personal digital assistant, a cellular telephone, a laptop computer and an email paging device.

7. The system according to claim 1 wherein said servers include a primary server and a backup server.

8. The system according to claim 7 wherein when said backup server is processing requests, said backup sewer is operable to assume the role of said primary sewer when said primary sewer becomes available and at which point said primary server assumes the role of said backup server.

9. The system according to claim 7 wherein said primary server and said backup server are implemented on a single computing environment that is logically partitioned into said primary server and said backup server.

10. The system according to claim 7 wherein said servers include a plurality of software components comprising at least one application process that operates in a hot state to process said messages and otherwise operates in a warm state.

11. The system according to claim 10 wherein when said primary server is available then said primary server application process operates in said hot state, and when said primary server is unavailable then said backup servers bring its application process from said warm state to said hot state and is thereafter operable to process said messages from said clients.

12. The system according to claim 10 wherein said software components include a failover agent executing on each of said servers and communicating with each to verify whether each other said server is available.

13. The system according to claim 12 wherein when said primary server failover agent fails to communicate with said backup server failover agent then said primary server begins operating in a primary-only mode during which said primary server transaction log is flushed after each message.

14. The system according to claim 12 wherein when said backup server failover agent fails to communicate with said primary sewer failover agent then said backup server begins operating in a backup-only mode during which said backup server transaction log is flushed after each message.

15. The system according to claim 10 wherein said software components include a replication agent executing on each of said servers and communicating with each other to maintain said mirror image when both of said servers are available.

16. The system according to claim 10 wherein said software components include a checkpoint agent executing on each of said sewers and communicating with its respective transaction log, said checkpoint agent for flushing its respective transaction log to non-volatile storage.

17. The system according to claim 1 wherein said servers are operable to determine whether a received one of said messages is a duplicate and to return a result of a stored record representing a previous processing of said message in lieu of processing said message.

18. The system according to claim 1 wherein said message includes an Identifier of said client, a message identifier, and a message body.

19. The system according to claim 18 wherein said message body includes a request to purchase or sell a financial instrument.

20. The system according to claim 1 wherein said message includes a request that is processed as at least one discrete transaction, each of said transactions generating at least one transaction log record.

21. A method for operating a system for failover comprising the steps of:
  receiving, at a primary server, a request from a client;
  processing, at said primary server, said request as at least one transaction;
  saving, in volatile memory of said primary server, a transaction record respective to said at least one transaction;
  generating, at said primary server, a request to commit said transaction;
  mirroring said transaction record in volatile memory of said backup sewer; and, acknowledging, in said primary server, said commit request if said mirroring is successfully confirmed;
  repeating the foregoing steps for additional received messages; and
  immediately flushing said primary sewer volatile memory to non-volatile memory if said mirroring is unsuccessfully confirmed; and, thereafter ceasing further performance of said mirroring step; and, thereafter flushing each said transaction record to non-volatile memory after said saving step.

22. A method for operating a system for failover comprising the steps of:
  receiving, at a primary server, a request from a client;
  determining whether said request is a duplicate request, and if said request is a duplicate request, then returning, to said client, a previously stored result of processing said request and if said request is not a duplicate request, then
  processing, at said primary server, said request as at least one transaction;
  saving, in volatile memory of said primary server, a transaction record respective to said at least one transaction;
  generating, at said primary server, a request to commit said transaction;
  mirroring said transaction record in volatile memory of said backup server; and,
  acknowledging, in said primary server, said commit request if said mirroring is successfully confirmed.

* * * * *